(12) United States Patent
Jin et al.

(10) Patent No.: US 11,996,584 B2
(45) Date of Patent: May 28, 2024

(54) ICB ASSEMBLY, BATTERY MODULE INCLUDING SAME AND METHOD FOR MANUFACTURING SAME

(71) Applicant: LG Chem, Ltd., Seoul (KR)

(72) Inventors: Hee-Jun Jin, Daejeon (KR); Dal-Mo Kang, Daejeon (KR); Kyung-Mo Kim, Daejeon (KR); Seung-Joon Kim, Daejeon (KR); Jin-Yong Park, Daejeon (KR); Ho-June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 699 days.

(21) Appl. No.: 17/259,009

(22) PCT Filed: Sep. 4, 2019

(86) PCT No.: PCT/KR2019/011426
§ 371 (c)(1),
(2) Date: Jan. 8, 2021

(87) PCT Pub. No.: WO2020/055038
PCT Pub. Date: Mar. 19, 2020

(65) Prior Publication Data
US 2021/0288385 A1 Sep. 16, 2021

(30) Foreign Application Priority Data
Sep. 10, 2018 (KR) .................. 10-2018-0107986

(51) Int. Cl.
*H01M 50/20* (2021.01)
*H01M 50/211* (2021.01)
(Continued)

(52) U.S. Cl.
CPC ....... *H01M 50/503* (2021.01); *H01M 50/211* (2021.01); *H01M 50/50* (2021.01); *H01M 50/505* (2021.01)

(58) Field of Classification Search
CPC .. H01M 50/503; H01M 50/50; H01M 50/211; H01M 50/505
See application file for complete search history.

(56) References Cited

U.S. PATENT DOCUMENTS 9,246,195 B1 1/2016 Ahn et al.
2003/0091896 A1 5/2003 Watanabe et al.
(Continued)

FOREIGN PATENT DOCUMENTS

CN 104064721 A 9/2014
CN 105633449 A 6/2016
(Continued)

OTHER PUBLICATIONS

Extended European Search Report for Application No. 19861142.8, dated Mar. 29, 2021, 13 pages.
(Continued)

*Primary Examiner* — Olatunji A Godo
(74) *Attorney, Agent, or Firm* — Lerner David LLP

(57) ABSTRACT

Provided are an ICB assembly suitable for a battery module of a horizontal stack structure wherein unidirectional battery cells are stacked such that cell leads face each other, a battery module including the same and a method for manufacturing the same. The ICB assembly of the present disclosure includes an ICB frame configured to accommodate cell leads of unidirectional battery cells having the cell leads formed on one side such that the cell leads face each other are placed on the top surface and the bottom surface of the ICB frame; and a bus bar adapted to electrically connect to the cell leads by being assembled to the ICB frame.

19 Claims, 21 Drawing Sheets

(51) Int. Cl.
*H01M 50/50* (2021.01)
*H01M 50/503* (2021.01)
*H01M 50/505* (2021.01)

(56) References Cited

U.S. PATENT DOCUMENTS

| | | |
|---|---|---|
| 2004/0119442 A1 | 6/2004 | Lee et al. |
| 2006/0166086 A1 | 7/2006 | Kato |
| 2011/0039131 A1 | 2/2011 | Moon |
| 2013/0089755 A1 | 4/2013 | Park et al. |
| 2014/0023909 A1 | 1/2014 | Suzuki |
| 2014/0065448 A1 | 3/2014 | Ahn et al. |
| 2016/0197332 A1 | 7/2016 | Lee et al. |
| 2016/0268658 A1* | 9/2016 | Kong .................. H01M 10/613 |
| 2017/0125774 A1 | 5/2017 | Choi et al. |
| 2018/0048033 A1 | 2/2018 | Lee et al. |
| 2018/0205053 A1 | 7/2018 | Ryu et al. |

FOREIGN PATENT DOCUMENTS

| | | |
|---|---|---|
| CN | 108140779 A | 6/2018 |
| EP | 2343752 A2 | 7/2011 |
| EP | 3026728 A1 | 6/2016 |
| EP | 3054503 A1 | 8/2016 |
| JP | 2001256937 A | 9/2001 |
| JP | 2003197166 A | 7/2003 |
| JP | 2004311402 A | 11/2004 |
| JP | 2011040389 A | 2/2011 |
| JP | 2012212604 A | 11/2012 |
| JP | 2018530879 A | 10/2018 |
| KR | 20110017821 A | 2/2011 |
| KR | 20130039290 A | 4/2013 |
| KR | 20140032596 A | 3/2014 |
| KR | 20150022459 A | 3/2015 |
| KR | 20150022468 A | 3/2015 |
| KR | 101520393 B1 | 5/2015 |
| KR | 20150049461 A | 5/2015 |
| KR | 20150113827 A | 10/2015 |
| KR | 20150123495 A | 11/2015 |
| KR | 101686583 B1 | 12/2016 |

OTHER PUBLICATIONS

International Search Report for Applicatin No. PCT/KR2019/01146, dated Dec. 26, 2019, 2 pages.
Search Report dated Aug. 30, 2023 from the Office Action for Chinese Application No. 201980036790.X dated Sep. 1, 2023, 3 pages. [See p. 1-2, categorizing the cited references].

* cited by examiner (a)

(b)

(c)

(a)

(b)

(c)

(a)

(b)

(a)

(b)

(a)

(b)

ICB ASSEMBLY, BATTERY MODULE INCLUDING SAME AND METHOD FOR MANUFACTURING SAME

CROSS-REFERENCE TO RELATED APPLICATIONS

This application is a national phase entry under 35 U.S.C. § 371 of PCT/KR2019/011426, filed on Sep. 4, 2019, and claims priority to Korean Patent Application No. 10-2018-0107986, filed on Sep. 10, 2018 in the Republic of Korea, the disclosures of which are each incorporated herein by reference.

TECHNICAL FIELD

The present disclosure relates to a battery module and a method for manufacturing the same, more particularly to a battery module which can be assembled easily and can be extended via a simple process, a method for manufacturing the same, and a component that can be used for manufacturing the battery module.

BACKGROUND ART

Recently, the secondary battery, which is highly applicable to various products and has superior electrical properties such as high energy density, etc., is used commonly not only in portable devices but also in electric vehicles (EVs), hybrid electric vehicles (HEVs), etc. which are powered by electrical power sources. The secondary battery is attracting attentions as a new energy source for improving environment friendliness and energy efficiency in that it is advantageous in that it can reduce the use of fossil fuels remarkably and no byproduct of energy use is generated at all.

The secondary batteries widely used at present include a lithium-ion battery, a lithium polymer battery, a nickel-cadmium battery, a nickel-hydrogen battery, a nickel-zinc battery, etc. In the secondary battery, the operation voltage of a single battery cell is about 2.5-4.5 V. Accordingly, when a higher output voltage is required, a plurality of battery cells are often connected in series to form a battery pack. In addition, a plurality of battery cells are often connected in parallel to form a battery pack depending on the charge-discharge capacity required for the battery pack. Accordingly, the number of battery cells included in a battery pack may be set variously depending on the required output voltage or charge-discharge capacity, and a plurality of battery cells may be stacked by being connected via various combinations of serial/parallel connections. In the battery pack of middle- or large-sized devices, pouch-type battery cells are used frequently due to the advantages of easy stacking and small weight. In general, a battery pack including a plurality of battery cells is configured by forming a battery module first by connecting a plurality of battery cells in series or parallel and then adding other components to the battery module.

FIG. 1 is a perspective view of a pouch-type battery cell constituting a unit cell in a general battery module.

The battery cell 110 shown in FIG. 1 is a plate-shaped unidirectional battery cell with cell leads 112 formed on one side. Specifically, the battery cell 110 has a structure wherein an electrode assembly 105 is provided on a pouch-type case 120 of a laminate sheet including a metal layer and a resin layer and then a sealing portion (SP) is formed, e.g., by heat sealing. Of the cell leads 112, one with positive (+) polarity is connected to a positive electrode plate inside the electrode assembly 105, and one with negative (−) polarity is connected to a negative electrode plate inside the electrode assembly 105.

The unit cell of the battery module may be formed by one or two or more of the battery cells 110 connected in series or parallel. FIG. 2 is a side view of a 3P bank unit cell wherein three battery cells 110 are connected in parallel.

Referring to FIG. 2, the battery cells 110 are laid horizontally and stacked vertically such that the cell leads 112 of the same polarity are placed up and down. In one unit cell 200, the cell lead 112 is exposed on one side.

In general, the unit cell 200 is manufactured as a battery module with a vertical stack structure. In the battery module of a vertical stack structure, the unit cells 200 are stood upright so that the cell leads 112 are located at one side and then coupled with a single interconnection board (ICB) assembly. The ICB assembly is an ICB frame equipped with a bus bar. It achieves electrical connection of the unit cell 200 via connection with the cell leads 112 and transmits electrical signals corresponding to the temperature of the battery cell 110 and electrical signals corresponding to the current or voltage of the battery cell 110 during repeated charge and discharge of the battery cell 110 to a battery management system (BMS). For a battery module of a horizontal stack structure wherein the unit cells 200 are laid horizontally such that the cell leads 112 of two unit cells 200 face each other, the method for manufacturing the battery module of a vertical stack structure and the ICB assembly described above cannot be applied per se.

FIG. 3 shows an exemplary battery module of a horizontal stack structure wherein eight of the unit cells 200 of FIG. 2 are used.

Referring to FIG. 3, two battery cell assemblies 230, which are formed by stacking the horizontally laid unit cells 200 in a vertical direction, are connected such that the cell leads 112 face each other to prepare a battery module 250. However, due to the structure wherein the cell leads 112 face each other between the two battery cell assemblies 230, welding at the side surface of the unit cells 200 is difficult, and the welding should be performed at the top surface of the unit cells 200. For top surface welding, it is impossible to prepare two battery cell assemblies 230 first and perform welding between them. On the other hand, after placing two unit cells 200 to face each other and performing welding between the cell leads 112 (first layer) on the top surface, two unit cells 200 are stacked thereon to face each other and welding is performed between the cell leads 112 (second layer) on the top surface. Then, after stacking two unit cells 200 thereon to face each other, welding is performed between the cell leads 112 (third layer) on the top surface. In this way, the unit cells 200 are assembled in a bottom-up manner by repeating the stacking and welding sequentially.

As described, the manufacturing process of the battery module 250 of a horizontal stack structure is very complicated. In addition, if it is desired that the Hv terminals (Hv positive electrode/negative electrode) are located on the top surface of the battery module 250 of a horizontal stack structure, it becomes very difficult to achieve electrical connection.

FIG. 4 and FIG. 5 illustrate the arrangement of unit cells 200 that can be considered for the battery module 250 of FIG. 3. In each figure, (a) shows a battery module 250 seen from the top surface, and (b) and (c) show the battery module 250 seen from the side surface. From among various arrangements, FIG. 4 and FIG. 5 show the cases where eight unit cells 200 can be connected to each other in series.

First, FIG. 4 shows a case where unit cells 200 facing each other are stacked such that the front sides face upward. Referring to (a), two unit cells 200 facing each other are placed such that the front sides face upward. The cell leads 112 of the unit cells 200 placed up and down may have opposite polarities as shown in (b) (option 1), or the cell leads 112 of the unit cells 200 placed up and down may have the same polarity as shown in (c) (option 2).

And, FIG. 5 shows a case where unit cells 200 facing each other are stacked such that the rear side faces upward for one and the front side faces upward for the other. Referring to (a), of two unit cells 200 facing each other, a unit cell 200 on the left side is placed such that the rear side faces upward and a unit cell 200 on the right side is placed such that the front side faces upward. The cell leads 112 of the unit cells 200 placed up and down may have the same polarity as shown in (b) (option 3), or the cell leads 112 of the unit cells 200 placed up and down may have opposite polarities as shown in (c) (option 4).

As described, when eight unit cells 200 are connected in series in the battery module 250 of a horizontal stack structure, the number of cases of arrangement is 4 (options 1-4). In particular, if the Hv terminals are desired to be located on the top surface of the battery module 250, the electrical connection should be determined in consideration of their locations. In addition, when considering other serial/parallel connections other than the serial connection described above, the structure of electrical connection becomes more complicated. Particularly, the number of cases of connection between the cell leads 112 of the unit cells 200 for electrical connection is increased further. Accordingly, a method for preparing a battery module with the simplest connection method from among the numerous number of cases and an ICB assembly for carrying out the method are necessary.

DISCLOSURE

Technical Problem

The present disclosure is designed to solve the problems of the related art, and therefore the present disclosure is directed to providing an ICB assembly suitable for a battery module of a horizontal stack structure wherein unidirectional battery cells are stacked such that cell leads face each other, a battery module including the same, and a method for manufacturing the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

An ICB assembly according to the present disclosure includes: an ICB frame configured to accommodate cell leads of unidirectional battery cells having the cell leads formed on one side of the unidirectional battery cells such that the cell leads face each other and are placed on the top surface and the bottom surface of the ICB frame; and a bus bar electrically connected to the cell leads by being assembled to the ICB frame.

The ICB frame is formed to accommodate to bus bars of various shapes.

Specifically, the ICB frame has several steps and bus bar insertion holes formed such that at least one of a bus bar connected to one of the cell leads, a bus bar for connecting the cell leads facing each other, or a bus bar for connecting the cell leads placed up and down with respective to the ICB frame.

And, the bus bar is a combination of bus bars selected from a group of bus bars having different shapes that can be assembled with the ICB frame through the steps and bus bar insertion holes considering electrical connection.

In an exemplary embodiment, the ICB frame is a plate-shaped structure having a length and a width and includes a cell lead receiving part capable of receiving the cell leads of the battery cells such that the battery cells face each other with respect to a center line in a length direction on both sides, an Hv terminal receiving part and bus bar insertion holes.

The bus bar may be detachably assembled to the cell lead receiving part.

The cell lead receiving part may be formed along first and second sides in the length direction of the ICB frame and may include a first cell lead receiving part and a third cell lead receiving part along the first side and a second cell lead receiving part facing the first cell lead receiving part and a fourth cell lead receiving part facing the third cell lead receiving part along the second side, and the Hv terminal receiving part may be formed on third and fourth sides in the width direction, perpendicularly to the first and second sides, and may include a first Hv terminal receiving part in the third side and a second Hv terminal receiving part in the fourth side.

In an exemplary embodiment, the first to fourth cell lead receiving parts and the first and second Hv terminal receiving parts may be formed on the top surface of the ICB frame, first to fourth opposite cell lead receiving parts formed mirror-symmetrically to the first to fourth cell lead receiving parts may be formed on the opposite sides of the first to fourth cell lead receiving parts on the bottom surface of the ICB frame, and first and second opposite Hv terminal receiving parts formed mirror-symmetrically to the first and second Hv terminal receiving parts may be formed on the opposite sides of the first and second Hv terminal receiving parts.

The bus bar insertion holes may include a first bus bar insertion hole allowing insertion of a first bus bar from the third side toward the first cell lead receiving part, a second bus bar insertion hole allowing insertion of a second bus bar from the third side toward the second cell lead receiving part, a third bus bar insertion hole allowing insertion of a third bus bar from the fourth side toward the third cell lead receiving part, and a fourth bus bar insertion hole allowing insertion of a fourth bus bar from the fourth side toward the fourth cell lead receiving part, an additional first bus bar insertion hole allowing insertion of a another first bus bar from the third side toward the first opposite cell lead receiving part, an additional second bus bar insertion hole allowing insertion of another second bus bar from the third side toward the second opposite cell lead receiving part, an additional third bus bar insertion hole allowing insertion of another third bus bar from the fourth side toward the third opposite cell lead receiving part, and an additional fourth bus bar insertion hole allowing insertion of another fourth bus bar from the fourth side toward the fourth opposite cell lead receiving part, and a first side bus bar insertion hole formed between the second cell lead receiving part and the fourth cell lead receiving part inwardly from the second side, and a second side bus bar insertion hole formed between the first cell lead receiving part and the third cell lead receiving part inwardly from the first side.

In an ICB assembly according to an exemplary embodiment, the bus bar includes a first Hv terminal bus bar including a first portion placed on the first Hv terminal receiving part and a second portion placed on the second cell lead receiving part, a second Hv terminal bus bar including a first portion placed on the second Hv terminal receiving part and a second portion placed on the third cell lead receiving part, a first bus bar for connection placed on the second opposite cell lead receiving part, a second bus bar for connection placed on the third opposite cell lead receiving part, a first ⊏-shaped bus bar placed on the first and first opposite cell lead receiving parts at the same time, and a second ⊏-shaped bus bar placed on the fourth and fourth opposite cell lead receiving parts at the same time. The first Hv terminal bus bar is assembled by being placed on the first Hv terminal receiving part and the second cell lead receiving part, the second Hv terminal bus bar is assembled by being placed on the second Hv terminal receiving part and the third cell lead receiving part, the first bus bar for connection is assembled by being inserted into the additional second bus bar insertion hole, and the second bus bar for connection is assembled by being inserted into the additional third bus bar insertion hole, and the first ⊏-shaped bus bar is assembled by being inserted into the second side bus bar insertion hole, and the second ⊏-shaped bus bar is assembled by being inserted into the first side bus bar insertion hole.

In another ICB assembly according to an exemplary embodiment, the bus bar includes an S-shaped bus bar placed on the second opposite and third opposite cell lead receiving parts, a first bus bar for connection placed on the second cell lead receiving part, a second bus bar for connection placed on the third cell lead receiving part, a first ⊏-shaped bus bar is placed on the first and first opposite cell lead receiving parts at the same time, and a second ⊏-shaped bus bar placed on the fourth and fourth opposite cell lead receiving parts at the same time. The S-shaped bus bar is assembled by being placed on the second opposite and third opposite cell lead receiving parts, the first bus bar for connection is assembled by being inserted into the third bus bar insertion hole, and the second bus bar for connection is assembled by being inserted into the fourth bus bar insertion hole, and the first ⊏-shaped bus bar is assembled by being inserted into the second side bus bar insertion hole, and the second ⊏-shaped bus bar is assembled by being inserted into the first side bus bar insertion hole.

Specifically, the ICB frame may be a first ICB frame and coupled to a second ICB frame by a hinge structure in the length direction of the first and second ICB frames.

For example, each of the first and second ICB frames may have a rod-shaped protruding part formed on the side surface of the thereof such that the first and second ICB frames may be arranged along a length direction and may be coupled by a joint member equipped with a groove which is coupled to the protruding part between the side surfaces of the first and second ICB frames.

The bus bar may be assembled to the top surface and the bottom surface of the ICB frame.

A method for manufacturing a battery module according to the present disclosure is performed using the ICB assembly according to the present disclosure.

The method for manufacturing a battery module according to the present disclosure may include: (a) a step of preparing an ICB assembly including an ICB frame configured to accommodate cell leads of unidirectional battery cells having the cell leads formed on one side thereof such that the cell leads face each other; and a bus bar adapted to electrically connect cell leads by being assembled to the ICB frame, wherein the ICB frame is configured to accommodate bus bars of different shapes; (b) a step of arranging the ICB assembly in the length direction of the ICB frame by coupling the ICB frame of the ICB assembly with a second ICB frame of a second ICB assembly via a hinge structure in a side-by-side relationship; (c) a step of arranging the battery cells to face each other on a plane by receiving the battery cells on the top surface and the bottom surface of the ICB frame on the left and right sides of the length direction of the side-by-side coupled ICB frame, wherein the battery cells are arranged on a plane by receiving the cell leads on the bus bar and the ICB assembly and the battery cells are connected by collectively welding the bus bar and the cell leads to the arranged battery cells on the top surface and the bottom surface; (d) a step of stacking the battery cells by folding the arranged ICB frame at the hinge portion; and (e) a step of assembling an additional bus bar between the bus bar exposed at the side surface of the ICB frame.

In the step (c), after said arranging the battery cells to face each other on a plane by receiving the battery cells on the top surface of the ICB frame on the left and right sides of the length direction of the side-by-side coupled ICB frame, wherein the battery cells are arranged on a plane by receiving the cell leads on the bus bar and the ICB assembly and the battery cells are connected by collectively welding the bus bar and the cell leads to the arranged battery cells on the top surface, the ICB assembly and the battery cells connected may be overturned such that the bottom surface of the ICB frame faces upward, and the remaining battery cells may be arranged on the bottom surface of the ICB frame and the bus bar and the cell leads may be welded collectively.

A battery module according to the present disclosure includes the ICB assembly according to the present disclosure.

The battery module according to the present disclosure is a battery module with battery cells, ICB assemblies, and battery cell units wherein unidirectional battery cells having cell leads formed on one side are placed and connected to face each other with one of the ICB assemblies therebetween, the battery cells, the ICB assemblies and the battery cell unites being stacked from the ground surface in a height direction, wherein each ICB assembly includes an ICB frame accommodating the cell leads; and a bus bar electrically connected to the cell leads by being assembled to the ICB frame, wherein the stacked ICB assemblies are connected by a joint member and an additional bus bar for serial connection of the battery cells up and down is coupled to the side surface of the stacked ICB assembly, four battery cells are connected to one ICB assembly as the battery cells are connected to the top surface and the bottom surface of the ICB assembly, and the two battery cells placed up and down are connected in series by the bus bar assembled to the ICB frame, and the ICB frame of each ICB assembly has the same shape and various ICB assemblies are prepared by changing the bus bar only.

Specifically, the battery cells are bank unit cells stacked in parallel such that the cell leads of the same polarity are contacted with each other.

Advantageous Effects

According to the present disclosure, there are provided an ICB assembly suitable for a battery module of a horizontal stack structure wherein unidirectional battery cells are stacked such that cell leads face each other, and a method for manufacturing a battery module using the same.

In the ICB assembly of the present disclosure, unidirectional battery cells having the cell leads formed on one side are placed such that the cell leads face each other. Accordingly, it can be conveniently used in manufacturing of a battery module wherein horizontally stacked unidirectional battery cells face each other. The ICB assembly of the present disclosure is distinguished from the ICB assembly used in the existing battery module of a vertical stack structure.

According to the ICB assembly of the present disclosure, bus bars of different shapes may be assembled to the same ICB frame. Therefore, various electrical connection becomes possible.

According to the present disclosure, after forming several steps and bus bar insertion hole that can assemble the various bus bars to any location of the ICB frame, the bus bars of desired shapes can be assembled at desired locations by selecting a combination of the steps and the bus bar insertion holes. The bus bar can be provided as a group of bus bars of various shapes that can be assembled to the ICB frame through the steps and the bus bar insertion holes formed on the ICB frame, and various combinations of bus bars selected in consideration of desired electrical connection can be assembled to the ICB frame. Accordingly, several electrical connections can be used for an ICB frame of a given shape by changing the bus bars. Therefore, the ICB assembly of the present disclosure is for general-use, multi-purpose and multi-use.

If the ICB assembly of the present disclosure is used, a battery module may be prepared by stacking a plurality of battery cells by arranging them on a plane, collectively welding the same and folding the same. In particular, according to the method for manufacturing a battery module of the present disclosure, the process of preparing a battery module wherein horizontally stacked unidirectional battery cells face each other becomes very simple.

Formerly, a battery module of a horizontal stack structure could be manufactured only by repeating the steps of stacking battery cells and welding cell leads several times. But, the method for manufacturing a battery module of the present disclosure is very suitable for large-scale production because it is possible to stack the battery cells at once by welding and folding them at once. In addition, according to the present disclosure, the welding of cell leads and bus bars and the bonding of sensing wires can be completed at once before the stacking of battery cells.

The battery module of the present disclosure is very convenient for assembly because it includes the ICB assembly of the present disclosure. In addition, since the number of battery cells connected in series can be increased through a simple process of further adding battery cell-ICB assembly-battery cell units, the battery module can be extended as desired.

According to the present disclosure, a plurality of battery cells constituting a battery module may be connected simply from numerous number of cases of electrical connection. A hinge structure may be used as a stacking guide for stacking battery cells, and the electrical connection between ICB assemblies can be achieved by an additional bus bar on the side surface of an ICB frame.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Figure 1:
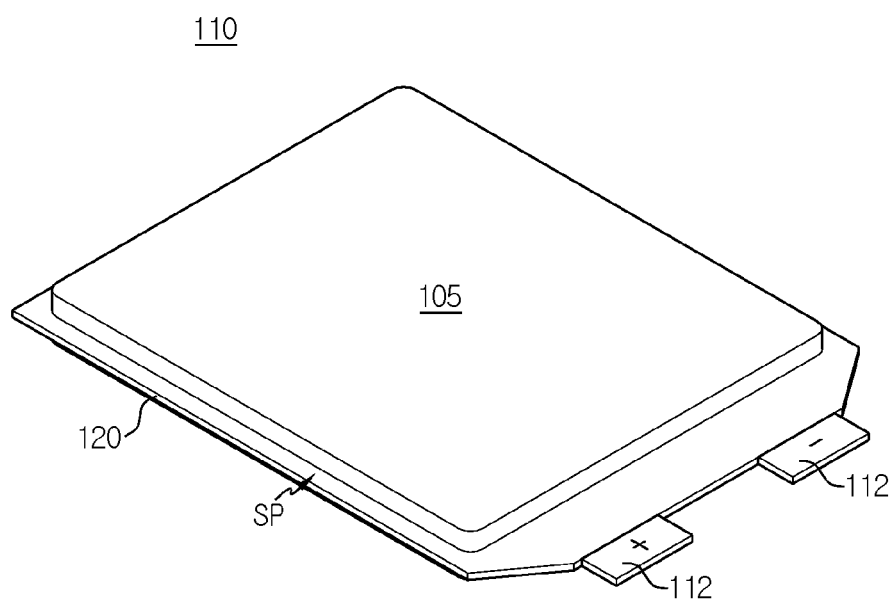
FIG. 1 is a perspective view of a pouch-type battery cell constituting a unit cell in a general battery module.

Hereinafter, specific exemplary embodiments of the present disclosure will be described in detail with reference to the accompanying drawings. However, the exemplary embodiments of the present disclosure can be changed into various other forms and it should not be construed that the scope of the present disclosure is limited by the following exemplary embodiments. The exemplary embodiments of the present disclosure are provided to describe the present disclosure more fully to those of ordinary skill in the art.

It should be understood that the terms and words used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation.

Therefore, the description and drawings proposed herein are just preferable examples for the purpose of illustrations only, not intended to limit the scope of the disclosure. So, it should be understood that other equivalents and modifications could be made thereto without departing from the scope of the disclosure.

The present disclosure provides a component that can be used for manufacturing a battery module, which can be assembled easily and extended via a simple process, and a battery module using the same and a method for manufacturing the same. Particularly, the present disclosure relates to a novel ICB assembly suitable for a battery module wherein horizontally stacked unidirectional battery cells face each other. The present disclosure provides a novel method for manufacturing a battery module that can be welded and stacked collectively using the same. The present disclosure also provides battery module that can be extended via a simple process using the same.

The novel ICB assembly allows assembly of bus bars of various shapes to an ICB frame for electrical connection. Several ICB frames may be used depending on the desired electrical connection. For this, bus bars of different shapes may be used for the same ICB frame depending on the desired electrical connection.

As described, the present disclosure allows easy embodiment of electrical connection using bus bars of different shapes for the same ICB frame.

Hereinafter, the present disclosure is described using, for example, a 3P8S battery module. However, the present disclosure is not limited thereto. If more parallel connection is necessary, the number of battery cells in a unit cell bank can be increased. If stacking using the ICB assembly becomes difficult due to increased unit cell thickness because of the increased number of battery cells, a spacer may be used for assembly.

If more serial connection is necessary, the unit cell-ICB assembly-unit cell unit may be increased. Because two unit cells facing each other or two layers of four unit cells facing each other can be assembled in one ICB assembly, the number of unit cells increases in even numbers as the number of the ICB assembly increases.

Figure 5:
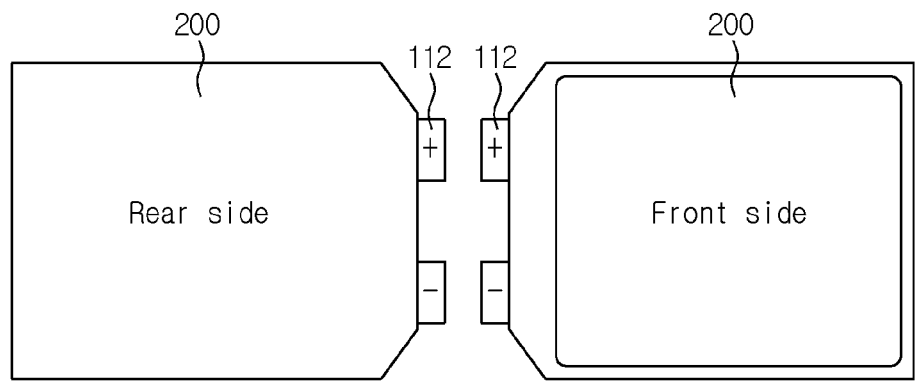
Figure 5:
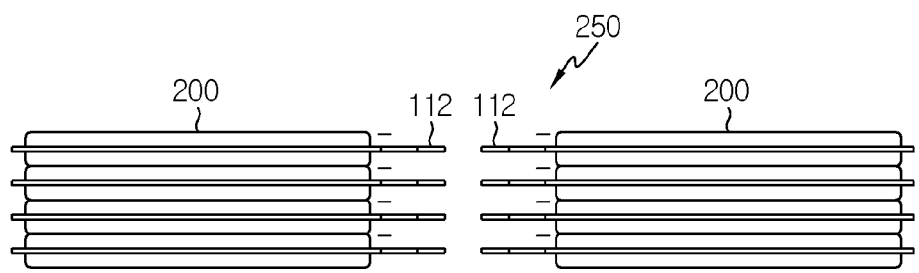
Figure 5:
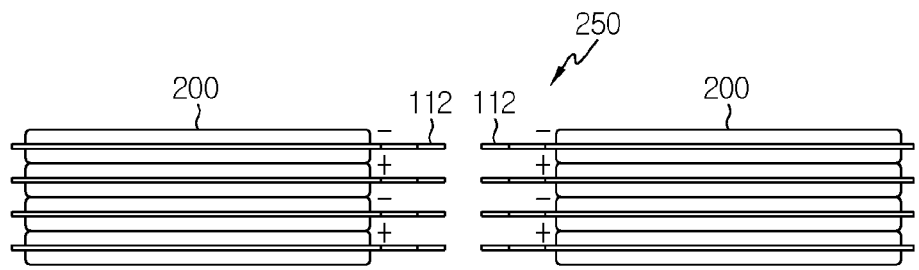

For example, FIG. 5 (b) shows preparation of a battery module arranged as in the option 4.

Figure 6:
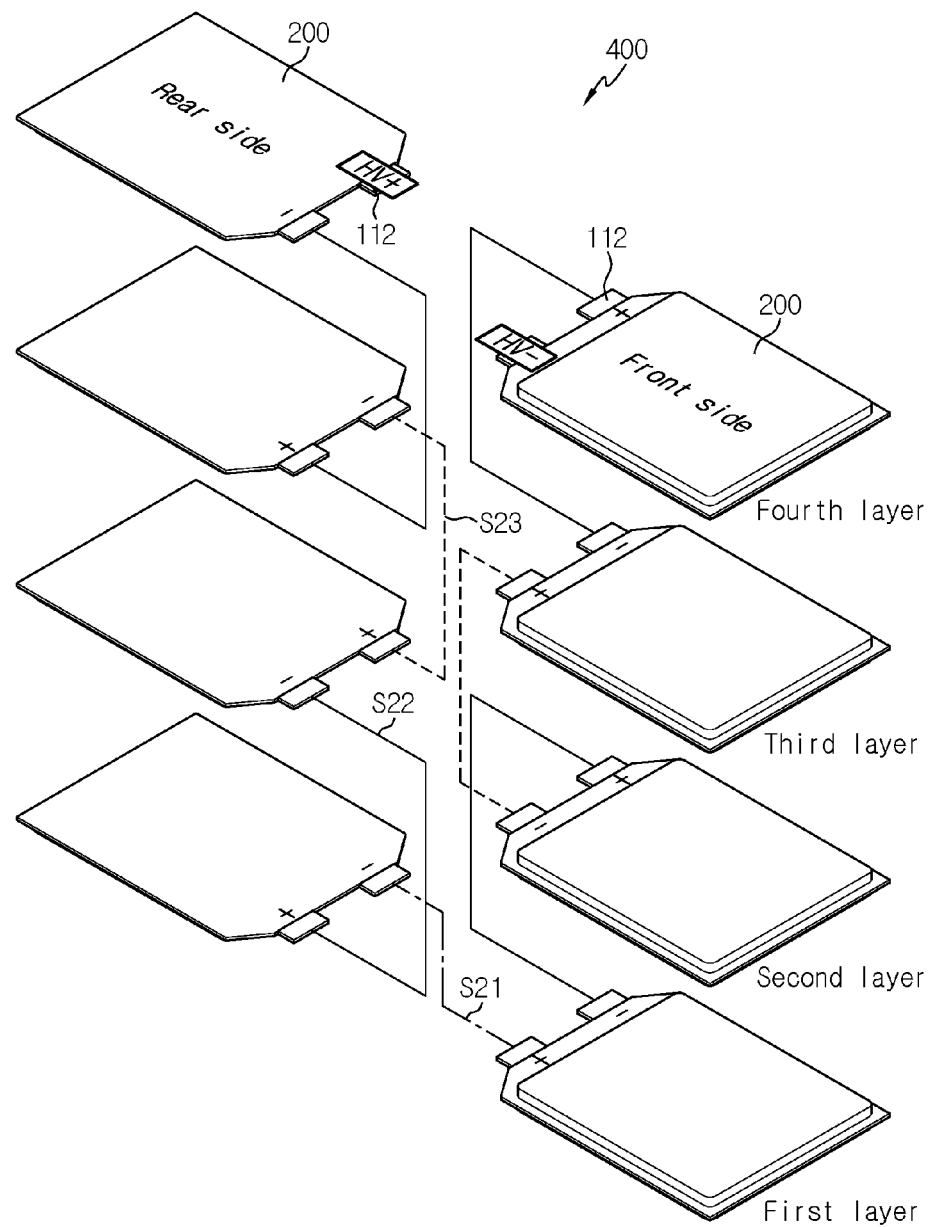
FIG. 6 shows the electrical connection of a 3P8S battery module according to an exemplary embodiment of the present disclosure.

FIG. 6 shows the electrical connection of a 3P8S battery module according to an exemplary embodiment of the present disclosure.

In a battery module 400 of FIG. 6, four layers of unit cells 200 facing each other are stacked in a height direction so that one has the rear side facing upward and the other has the front side facing upward. Hv terminals [Hv positive electrode (Hv+) and Hv negative electrode (Hv−)] are located on the top surface of the battery module 400. The polarity of cell leads 112 of the unit cells 200 placed up and down is alternated, and the polarity of cell leads 112 of the unit cells 200 facing each other is identical.

Numerous electrical connection is possible between the plurality of unit cells 200 constituting the battery module 400. The present disclosure provides the simplest and easiest connection.

Assuming a first layer, a second layer, a third layer and a fourth layer from the bottom in the height direction, the cell leads 112 of the unit cells 200 facing each other in each layer of the second to fourth layers are not connected in plane. Only the cell leads 112 of the unit cells 200 facing each other in the first layer are connected in series (S21) in plane, as marked by the dash-single dotted line. The cell leads 112 of the unit cells 200 placed up and down are connected in series (S22) as marked by the solid line or are connected in series (S23) as marked by the broken line.

For example, the positive electrode cell lead 112 of the left unit cell 200 in the fourth layer is connected to the Hv positive electrode (Hv+) on the top surface of the battery module 400. The negative electrode cell lead 112 of the left unit cell 200 in the fourth layer is connected to the positive electrode cell lead 112 of the left unit cell 200 in the third layer. Therefore, the unit cell 200 in the fourth layer and the left unit cell 200 in the third layer are connected in series (S22) up and down. The negative electrode cell lead 112 of the left unit cell 200 in the third layer is connected to the positive electrode cell lead 112 of the left unit cell 200 in the second layer. Therefore, the left unit cell 200 in the third layer and the left unit cell 200 in the second layer are connected in series (S23) up and down. The negative electrode cell lead 112 of the left unit cell 200 in the second layer is connected to the positive electrode cell lead 112 of the left unit cell 200 in the first layer. Therefore, the left unit cell 200 in the second layer and the left unit cell 200 in the first layer are connected in series (S22) up and down. The negative electrode cell lead 112 of the left unit cell 200 in the first layer is connected to the positive electrode cell lead 112 of the right unit cell 200 in the first layer. Therefore, the left unit cell 200 in the first layer and the right unit cell 200 in the first layer are connected in series (S21) in plane.

The negative electrode cell lead 112 of the right unit cell 200 in the first layer is connected to the positive electrode cell lead 112 of the right unit cell 200 in the second layer. Therefore, the right unit cell 200 in the first layer and the right unit cell 200 in the second layer are connected in series (S22) up and down. The negative electrode cell lead 112 of the right unit cell 200 in the second layer is connected to the positive electrode cell lead 112 of the right unit cell 200 in the third layer. Therefore, the right unit cell 200 in the second layer and the right unit cell 200 in the third layer are connected in series (S23) up and down. The negative electrode cell lead 112 of the right unit cell 200 in the third layer is connected to the positive electrode cell lead 112 of the right unit cell 200 in the fourth layer. Therefore, the right unit cell 200 in the third layer and the right unit cell 200 in the fourth layer are connected in series (S22) up and down. The negative electrode cell lead 112 of the right unit cell 200 in the fourth layer is connected to the Hv negative electrode (Hv−) on the top surface of the battery module 400.

In this exemplary embodiment, the battery module 400 is manufactured by applying one ICB frame per four bank unit cells 200 in each layer of the first to fourth layers. In FIG. 6, one ICB frame is connected between the unit cells 200. That is to say, one ICB frame is necessary for two layers, and four unit cells 200 are placed on one ICB frame. Two unit cells are placed on the top surface of the ICB frame, and the remaining two unit cells are placed on the bottom surface of the ICB frame.

If an ICB frame in which two unit cells 200 are placed only on the top surface is called a type 1 ICB frame, the ICB frame in which four unit cells 200 are connected according to this exemplary embodiment may be called a type 2 ICB frame for distinction. In this exemplary embodiment, a total of two type2 ICB frames are necessary because there are eight unit cells 200. The ICB frames may be connected side by side in the length direction, and the shape of the connected ICB frames is identical. Herein, various electrical connections can be realized by using bus bars of different shapes. For example, the battery module 400 may be manufactured by preparing various ICB assemblies by using bus bars of various shapes in the ICB frame of the same shape, e.g., a ⊏-shaped bus bar for one ICB frame and an S-shaped bus bar for another ICB frame.

The method for manufacturing a battery module according to the present disclosure includes a step of preparing several ICB assemblies by changing bus bars for the ICB frame of the same shape. In this exemplary embodiment, the ICB assembly may be connected such that the cell leads of four unit cells including unidirectional battery cells having the cell leads formed on one side face each other. The number of the ICB assembly is increased by one as the number of the unit cells connected in series are increased by four. Accordingly, two, three, four, etc. of ICB assemblies are required as the number of the unit cells connected in series are increased by eight, twelve, sixteen, etc. Each ICB assembly may be prepared by changing the shape of the bus bar for the ICB frame of the same shape. The bus bar is selected in consideration of the electrical connection between the unit cells.

The bus bar may be applied to the ICB frame by simple assembly. Examples may include placement, insertion, fitting, etc. The bus bar is detachably assembled to the ICB frame. That is to say, it may be assembled not permanently but in a manner that it can be removed at the location of assembly.

Figure 7:
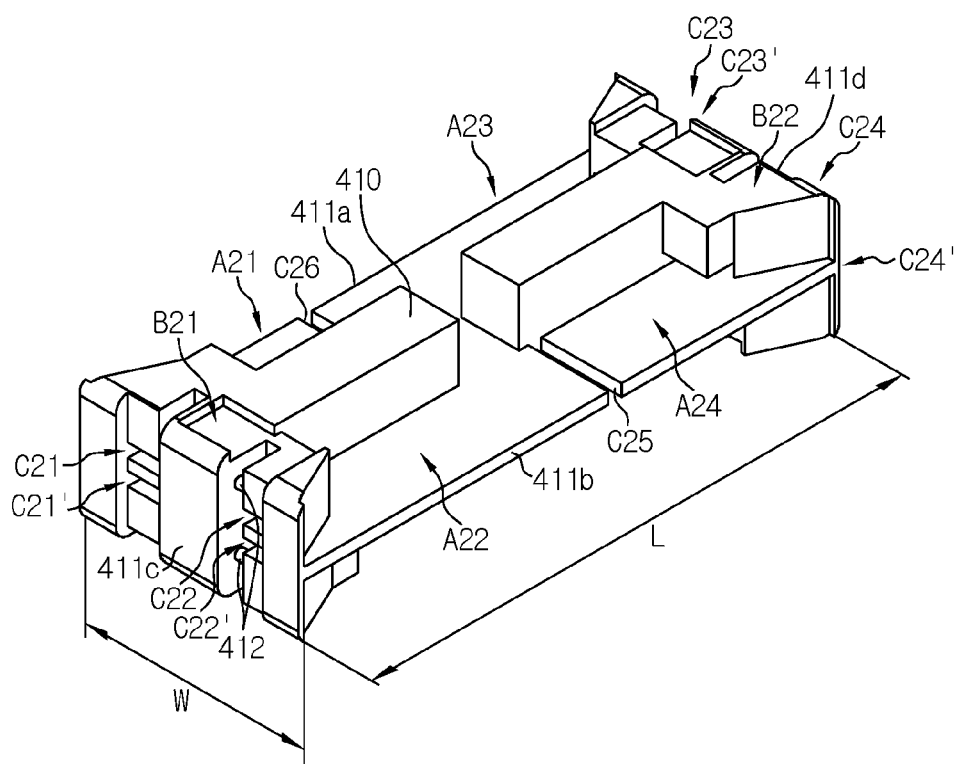
FIG. 7 and FIG. 8 are perspective views of an ICB frame according to an exemplary embodiment of the present disclosure.
Figure 8:
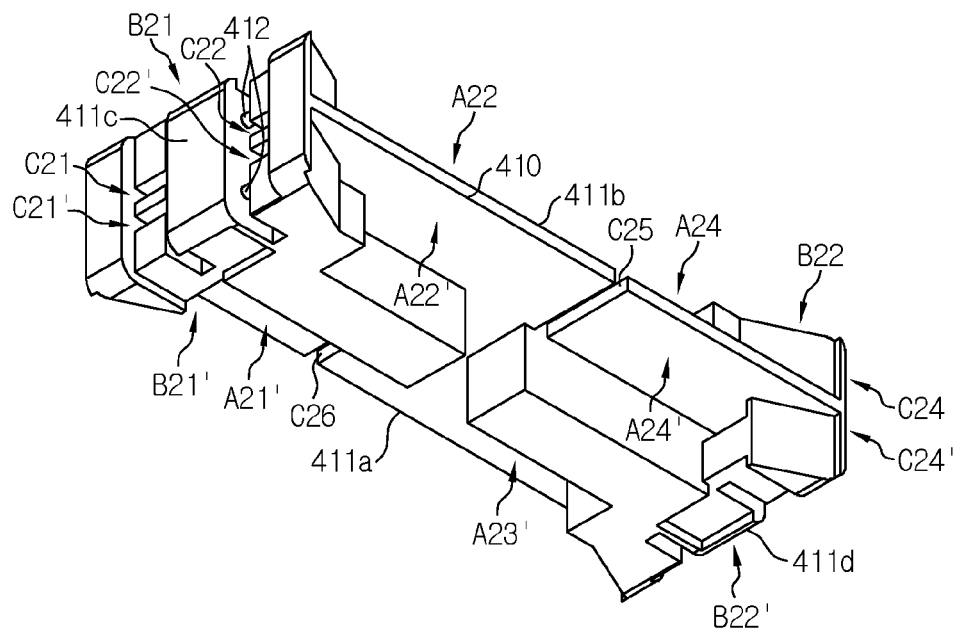

FIG. 7 and FIG. 8 are perspective views of an ICB frame according to an exemplary embodiment of the present disclosure. A type 2 ICB frame with no bus bar assembled is shown. FIG. 7 shows the top surface of the ICB frame, and FIG. 8 shows the bottom surface of the ICB frame.

Referring to FIG. 7 and FIG. 8, an ICB frame 410 may be provided between unidirectional battery cells (the unit cells 200 of FIG. 2) facing each other. Because the unidirectional battery cells face each other on both sides of the ICB frame 410, it may be called a 'central' ICB frame.

A total of four unit cells 200 may be connected to one ICB frame 410 as two unit cells 200 are connected onto the top surface of the ICB frame 410 and two unit cells 200 are connected onto the bottom surface of the ICB frame 410.

The ICB frame 410 is a plate-shaped structure having a length (L) approximately corresponding to the side of the cell leads of the battery cells and a width (W) smaller than it, so that the cell leads of the cells can be received, and is formed such that bus bars of various shapes can be assembled for electrical connection with the cell leads of the battery cells.

First, referring to FIG. 7, on the top surface of the ICB frame 410, cell lead receiving parts A21-A24 are formed along first and second sides 411a, 411b on both sides in the length (L) direction, so that the unidirectional battery cells face each other with respect to a center line in the length (L) direction. Through this, the first cell lead receiving part A21 and the third cell lead receiving part A23 are formed along the first side 411a, and the second cell lead receiving part A22 facing the first cell lead receiving part A21 and the fourth cell lead receiving part A24 facing the third cell lead receiving part A23 are formed along the second side 411b. For example, the cell leads of the left unit cells are placed on the cell lead receiving parts A21, A23 formed on the first side 411a, and the cell leads of the right unit cells are placed on the cell lead receiving parts A22, A24 formed on the second side 411b.

Hv terminal receiving parts B21, B22 are formed respectively on third and fourth sides 411c, 411d in the width (W) direction, perpendicularly to the sides 411a, 411b in the length (L) direction. The first Hv terminal receiving part B21 is formed on the third side 411c, and the second Hv terminal receiving part B22 is formed on the fourth side 411d.

Bus bar insertion holes C21, C22 may be formed on one side in the width (W) direction. For example, they may be formed on the third side 411c where the first Hv terminal receiving part B21 is formed. The first bus bar insertion hole C21 is for insertion of a bus bar from the third side 411c toward the first cell lead receiving part A21 for assembly, and the second bus bar insertion hole C22 is for insertion of another bus bar from the third side 411c toward the second cell lead receiving part A22 for assembly.

Bus bar insertion holes C23, C24 may also be formed on the other side in the width (W) direction at locations corresponding to the bus bar insertion holes C21, C22. That is to say, the bus bar insertion holes C23, C24 may be formed on the fourth side 411d where the second Hv terminal receiving part B22 is formed. The third bus bar insertion hole C23 is for insertion of a bus bar from the fourth side 411d toward the third cell lead receiving part A23 for assembly, and the fourth bus bar insertion hole C24 is for insertion of another bus bar from the fourth side 411d toward the fourth cell lead receiving part A24 for assembly. The third bus bar insertion hole C23 may be formed at a location 180° rotational symmetry to the second bus bar insertion hole C22 with respect to the center of the ICB frame 410. Likewise, the fourth bus bar insertion hole C24 may be formed at a location 180° rotational symmetry to the first bus bar insertion hole C21 with respect to the center of the ICB frame 410.

Side bus bar insertion holes C25, C26 are formed on both sides 411a, 411b in the length (L) direction, parallelly to the width (W) direction. The side bus bar insertion holes C25, C26 penetrate the ICB frame 410 in a direction perpendicular to the ground surface.

For example, the first side bus bar insertion hole C25 is formed between the second cell lead receiving part A22 and the fourth cell lead receiving part A24 at the second side 411b. The second side bus bar insertion hole C26 is formed between the first cell lead receiving part A21 and the third cell lead receiving part A23 at the first side 411a.

Next, referring to FIG. 8, on the bottom surface of the ICB frame 410, first to fourth opposite cell lead receiving parts A21'-A24' are formed mirror-symmetrically to the first to fourth cell lead receiving parts A21-A24 on the opposite side of the first to fourth cell lead receiving parts A21-A24. The cell leads of unit cells located below the unit cells placed on the first and third cell lead receiving parts A21, A23 are placed on one opposite cell lead receiving parts A21', A23', and the cell leads of other unit cells are placed on the other opposite cell lead receiving parts A22', A24' so as to face them. Other unit cells placed on the second and fourth cell lead receiving parts A22, A24 will be located on the unit cells.

Opposite Hv terminal receiving parts B21', B22' are formed on the opposite side of the Hv terminal receiving parts B21, B22. The first opposite Hv terminal receiving part B21' is formed at a location corresponding to the first Hv terminal receiving part B21, and the second opposite Hv terminal receiving part B22' is formed at a location corresponding to the second Hv terminal receiving part B22. The first and second opposite Hv terminal receiving parts B21', B22' are formed mirror-symmetrically to the first and second Hv terminal receiving parts B21, B22.

Referring to FIG. 7 and FIG. 8, additional first and second bus bar insertion holes C21', C22' are located at locations corresponding respectively to the first and second bus bar insertion holes C21, C22 with respect to the central plane passing through the center of the ICB frame 410 parallelly to the ground surface. Likewise, additional third and fourth bus bar insertion holes C23', C24' are located at locations corresponding respectively to the third and fourth bus bar insertion holes C23, C24 with respect to the central plane passing through the center of the ICB frame 410 parallelly to the ground surface.

The additional first bus bar insertion hole C21' is for insertion of a bus bar from the third side 411c toward the first opposite cell lead receiving part A21' for assembly, and the additional second bus bar insertion hole C22' is for insertion of another bus bar from the third side 411c toward the second opposite cell lead receiving part A22' for assembly. The additional third bus bar insertion hole C23' is for insertion of a bus bar from the fourth side 411d toward the third opposite cell lead receiving part A23' for assembly, and the additional fourth bus bar insertion hole C24' is for insertion of another bus bar from the fourth side 411d toward the fourth opposite cell lead receiving part A24' for assembly.

Since the first and second side bus bar insertion holes C25, C26 penetrate the ICB frame 410 in a direction perpendicular to the ground surface, the first side bus bar insertion hole C25 is formed on the bottom surface of the ICB frame 410 between the second opposite cell lead receiving part A22' and the fourth opposite cell lead receiving part A24'. The second side bus bar insertion hole C26 is formed between the first opposite cell lead receiving part A21' and the third opposite cell lead receiving part A23'.

As described, because the cell lead receiving parts A21-A24, A21'-A24' and the Hv terminal receiving parts B21, B22, B21', B22' are formed on the top surface and the bottom surface of the ICB frame 410, protruding and concave portions are present on both the top surface and the bottom surface. The ICB frame 410 may be prepared from an injection-molded plastic, etc. The ICB frame 410 may be designed to have a thickness similar to the thickness of two unit cells 200. As the number of battery cells included in the unit cell 200 increases, the thickness of the unit cell 200 is also increased and, accordingly, the thickness of the ICB frame 410 is increased. However, if it is difficult to increase the thickness of the ICB frame 410 as desired, a spacer may be introduced to make the thickness of the ICB frame 410 similar to the thickness of two unit cells 200.

As described, the cell lead receiving parts A21-A24, A21'-A24' and the Hv terminal receiving parts B21, B22, B21', B22' are formed on the ICB frame 410. The bus bar insertion holes C21-C26, C21'-C24' are also formed on the ICB frame 410. The cell lead receiving parts A21-A24, A21'-A24' and the Hv terminal receiving parts B21, B22, B21', B22' are formed on the ICB frame 410 as steps. These step and the bus bar insertion holes are provided such that a bus bar connected to any one cell lead of the cell leads placed on the ICB frame 410, a bus bar connecting the cell leads facing each other, or a bus bar connecting the cell leads placed up and down with respective to the ICB frame 410, etc. can be assembled at any desired location. In particular, the electrical connection with the cell leads 112 of the unit cells 200 on the top surface and the bottom surface of the ICB frame 410 can be achieved only when the bus bar is assembled to the top surface and the bottom surface of the ICB frame 410. Therefore, cell lead receiving parts and Hv terminal receiving part should be formed respectively on the top surface and the bottom surface of the ICB frame 410. This is the feature of the type 2 ICB frame described in this exemplary embodiment. In this sense, there is a big difference from the type 1 ICB frame.

Figure 9:
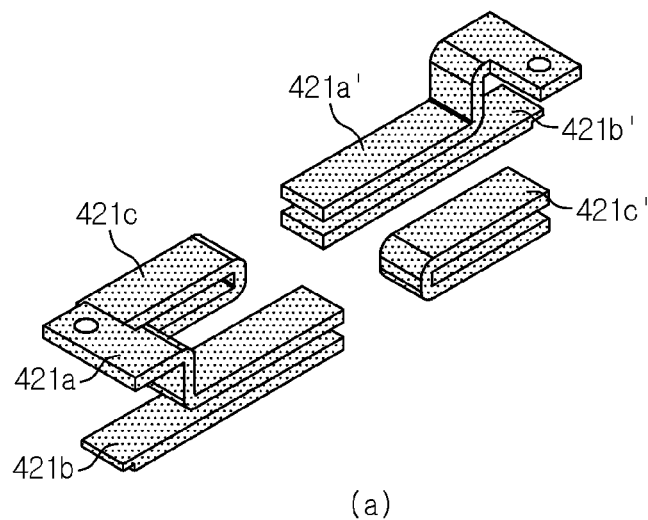
FIGS. 9-16 are perspective views of ICB assemblies according to an exemplary embodiment of the present disclosure.
Figure 9:
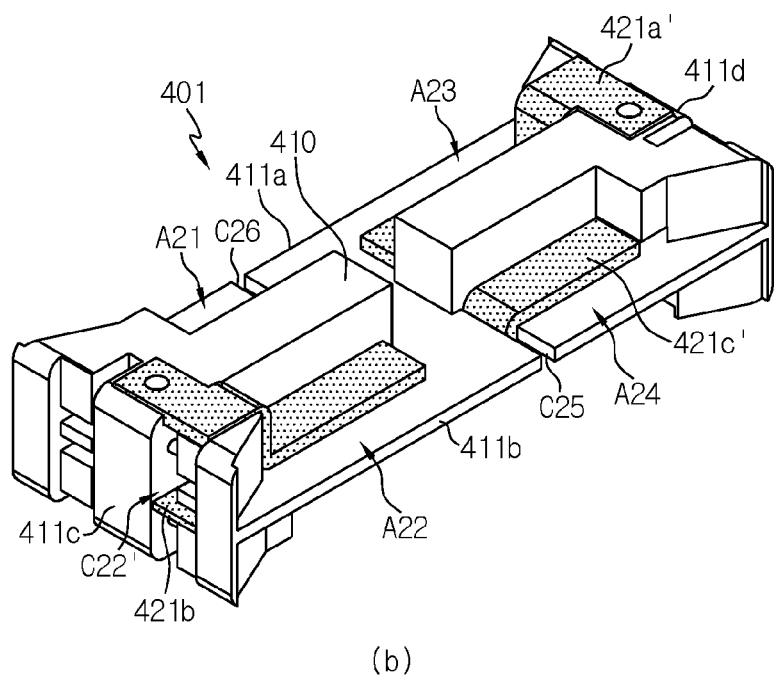
Figure 10:
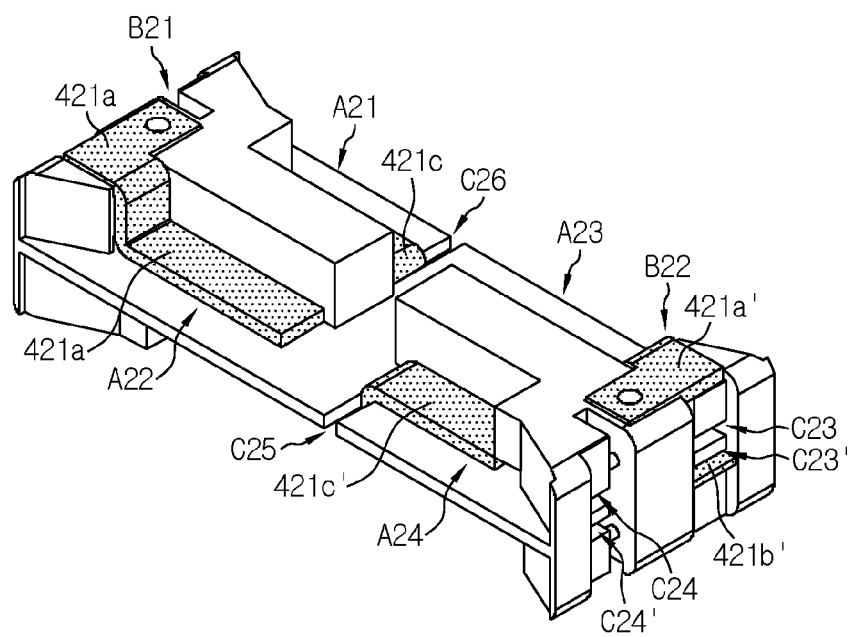
Figure 11:
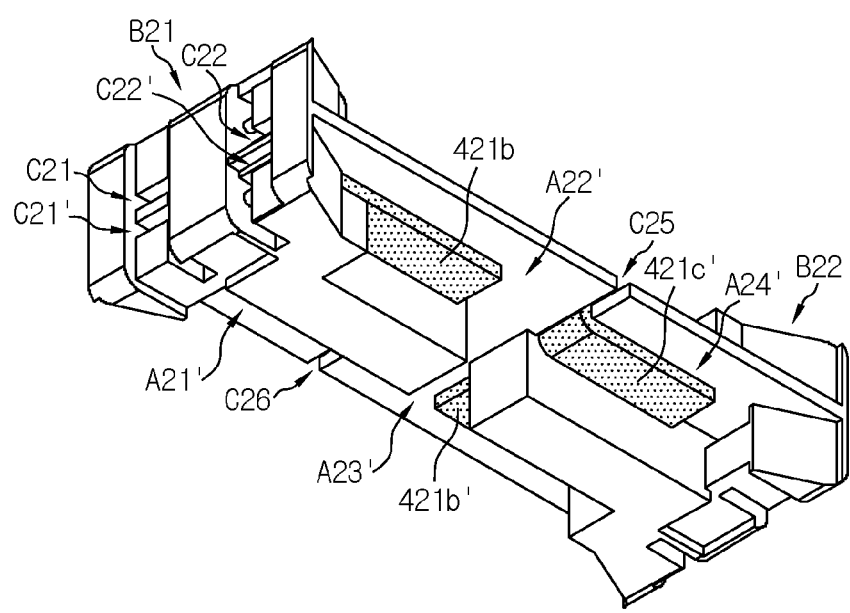
Figure 12:
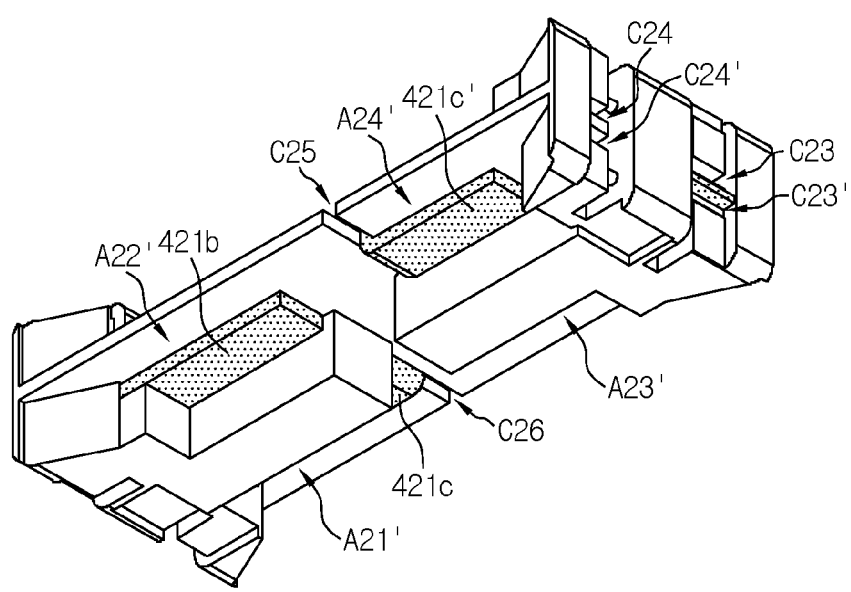
Figure 13:
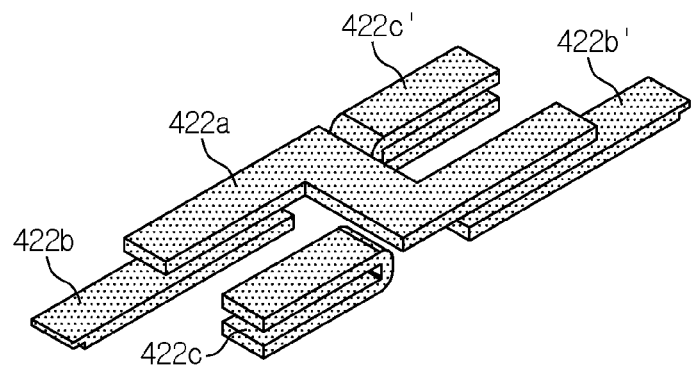
Figure 13:
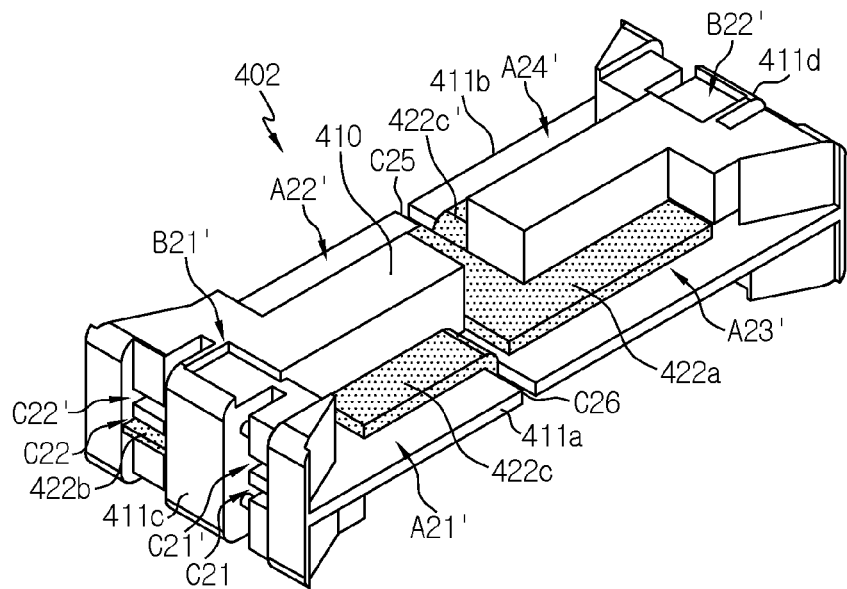
Figure 14:
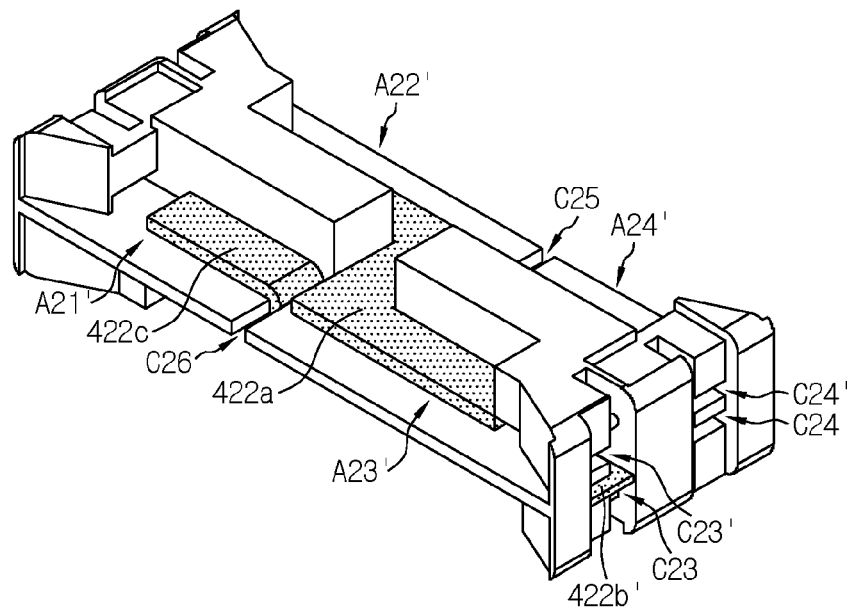
Figure 15:
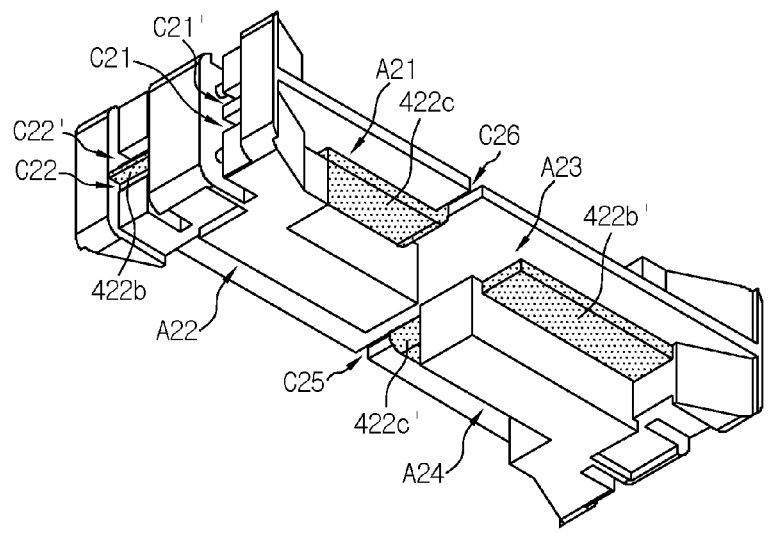
Figure 16:
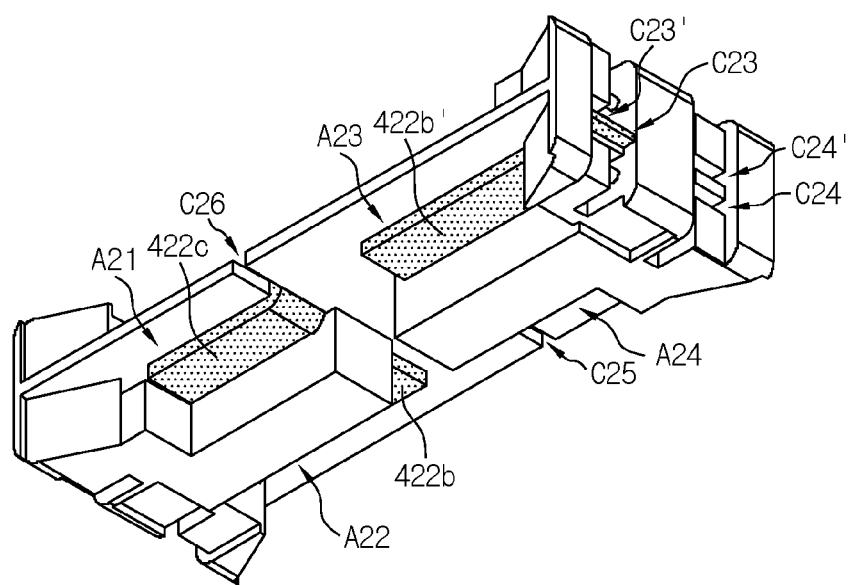

FIGS. 9-16 are perspective views of ICB assemblies according to an exemplary embodiment of the present disclosure. FIGS. 9-12 show an ICB assembly 401 and FIGS. 13-16 show an ICB assembly 402. In particular, FIG. 10 is a 180° rotated perspective view of FIG. 9 in the horizontal direction, FIG. 11 is a perspective view showing the bottom surface of FIG. 9, and FIG. 12 is a 180° rotated perspective view of FIG. 11 in the horizontal direction. FIG. 14 is a 180° rotated perspective view of FIG. 13 in the horizontal direction, FIG. 15 is a perspective view showing the bottom surface of FIG. 13, and FIG. 16 is a 180° rotated perspective view of FIG. 15 in the horizontal direction. In FIG. 9 and FIG. 13, (a) shows a bus bar coupled to the ICB frame, and (b) showed the ICB frame assembled with the bus bar of (a).

Referring to FIGS. 9-16, both the ICB assemblies 401, 402 of the present disclosure include the ICB frame 410 described referring to FIG. 7 and FIG. 8. The ICB assembly 401, 402 may further include a printed circuit board or a wire component for voltage sensing, or a printed circuit board or a wire component for voltage sensing may be further connected to the ICB assembly 401, 402. The ICB assembly 401, 402 includes a combination of bus bars of various shapes assembled to the ICB frame 410. The electrical connection with the cell leads 112 of the unit cells 200 is achieved as the bus bar is assembled to the ICB frame 410.

First, the ICB assembly 401 shown in FIGS. 9-12 is for electrical connection between the fourth layer on the top surface and the third layer therebelow in FIG. 6. Bus bars 421a, 421b, 421c, 421a', 421b', 421c' are assembled to the ICB frame 410.

In FIG. 9 and FIG. 10, the bus bar 421a and the bus bar 421a' are Hv terminal bus bars of the same shape. The bus bar 421a includes a portion placed on the first Hv terminal receiving part B21 and a portion placed on the second cell lead receiving part A22. In the following process, the negative electrode cell lead 112 of the right unit cell 200 in the fourth layer is connected to the bus bar 421a. Accordingly, the bus bar 421a forms an Hv negative electrode (Hv−) on the top surface of the battery module 400.

The bus bar 421a' includes a portion placed on the second Hv terminal receiving part B22 of the bus bar frame 410 and a portion placed on the third cell lead receiving part A23. The bus bar 421a and the bus bar 421a' are 180° rotationally symmetrical with respect to the center of the bus bar frame 410. In the following process, the positive electrode cell lead 112 of the left unit cell 200 in the fourth layer is connected to the bus bar 421a'. Accordingly, the bus bar 421a' forms an Hv positive electrode (Hv+) on the top surface of the battery module 400.

The bus bar 421b and the bus bar 421b' are bus bars for connection of the same shape and are assembled at locations 180° rotationally symmetrical to each other with respect to the center of the bus bar frame 410. The bus bar 421b is assembled to the second opposite cell lead receiving part A22' as shown in FIG. 11 or FIG. 12 by being inserted into the additional second bus bar insertion hole C22'. The bus bar 421b' is assembled to the third opposite cell lead receiving part A23' as shown in FIG. 11 by being inserted into the additional third bus bar insertion hole C23'.

The bus bars 421c, 421c' are ⊏-shaped bus bars and are assembled at locations 180° rotationally symmetrical with respect to the center of the bus bar frame 410. The bus bar 421c is assembled to be placed on the first and first opposite cell lead receiving parts A21, A21' by being inserted into the second side bus bar insertion hole C26 from the first side 411a of the bus bar frame 410. The bus bar 421c' is assembled to be placed on the fourth and fourth opposite cell lead receiving parts A24, A24' by being inserted into the first side bus bar insertion hole C25 from the second side 411b of the bus bar frame 410. As described, the bus bars 421c, 421c' are formed on the top surface and the bottom surface of the bus bar frame 410. Accordingly, the bus bars 421c, 421c' can connect the cell leads of the unit cells placed on the top surface of the bus bar frame 410 and the cell leads of the unit cells placed on the bottom surface of the bus bar frame 410. Therefore, the bus bars 421c, 421c' can connect the battery cells stacked up and down in series. Accordingly, the serial connection (S22) shown in FIG. 6 is achieved. As described, the ICB assembly 401 is a component which provides serial connection (S22) between the two unit cells 200 on the top surface, i.e., in the fourth layer, and in the third layer shown in FIG. 6 and forms the Hv negative electrode (Hv−) and the Hv positive electrode (Hv+) on the top surface of the battery module 400. The bus bar 421c of the ICB assembly 401 provides electrical connection between the left unit cell 200 in the fourth layer and the left unit cell 200 in the third layer shown in FIG. 6. The bus bar 421c' of the ICB assembly 401 provides electrical connection between the right unit cell 200 in the fourth layer and the right unit cell 200 in the third layer shown in FIG. 6.

In the ICB assembly 402 shown in FIGS. 13-16, bus bars 422a, 422b, 422c, 422b', 422c' are assembled to the ICB frame 410. The ICB frame 410 of FIG. 7 is overturned such that the bottom surface of the ICB frame 410 faces upward. It is a component for providing electrical connection in the second layer and the first layer of FIG. 6.

Referring to FIG. 13 and FIG. 14, the bus bar 422a is an S-shaped bus bar and is assembled to be placed on the second opposite and third opposite cell lead receiving parts A22', A23'. The bus bar 422a may serially connect (S21) the cell leads 112 of the unit cells 200 facing each other in the first layer.

The bus bar 422b and the bus bar 422b' are bus bars for connection of the same shape and are assembled at locations 180° rotationally symmetrical with respect to the center of the bus bar frame 410. The bus bar 422b is assembled to the second cell lead receiving part A22 by being inserted into the second bus bar insertion hole C22. The bus bar 422b' is assembled to the third cell lead receiving part A23 through the third bus bar insertion hole C23. The bus bars 421b, 421b', 422b, 422b' are identical to each other.

The bus bars 422c, 422c' are ⊏-shaped bus bars of the same shape and are assembled at locations 180° rotationally symmetrical with respect to the center of the bus bar frame 410. The bus bar 422c is assembled to be placed on the first and first opposite cell lead receiving parts A21, A21' by being inserted into the second side bus bar insertion hole C26 from the first side 411a of the bus bar frame 410. The bus bar 422c' is assembled to be placed on the fourth and fourth opposite cell lead receiving parts A24, A24' by being inserted into the first side bus bar insertion hole C25 from the second side 411b of the bus bar frame 410. The bus bars 422c, 422c' are formed on the top surface and the bottom surface of the bus bar frame 410. The bus bars 421c, 421c', 422c, 422c' are identical to each other.

Accordingly, like the bus bars 421c, 421c' of the ICB assembly 401, the bus bars 422c, 422c' of the ICB assembly 402 can also connect the cell leads of the unit cells placed on the top surface of the bus bar frame 410 and the cell leads of the unit cells placed on the bottom surface of the bus bar frame 410. Therefore, the bus bars 422c, 422c' can provide serial connection between the unit cells stacked up and down. Through this, the serial connection (S22) of FIG. 6 is realized. As described, the ICB assembly 402 provides electrical connection between the two unit cells in the second layer and the first layer shown in FIG. 6. The bus bar 422c of the ICB assembly 402 provides electrical connection between the right unit cells 200 in the second layer and the right unit cells 200 in the first layer shown in FIG. 6. The bus bar 422c' of the ICB assembly 402 also provides electrical connection between the left unit cells 200 in the second layer and the left unit cells 200 in the first layer shown in FIG. 6.

As described, the bus bars 421a, 421b, 421c, 421a', 421b', 421c', 422a, 422b, 422c, 422b', 422c' are combinations of bus bars selected from a group consisting of bus bars of various shapes that can be assembled to the ICB frame 410 via the steps and bus bar insertion holes C21-C26, C21'-C24' formed on the bus bar frame 410 in consideration of the electrical connection between the unit cells 200.

As described above, because several steps and bus bar insertion holes C21-C26, C21'-C24' that can assemble various bus bars to the ICB frame 410 at desired locations are formed, bus bars of desired shapes can be assembled at desired locations by selecting any combination of the step and bus bar insertion holes C21-C26, C21'-C24'. The bus bars may be provided as a group of bus bars of various shapes that can be assembled to the ICB frame 410 via the steps and bus bar insertion holes C21-C26, C21'-C24' formed on the ICB frame 410, and bus bars selected therefrom in consideration of the desired electrical connection, particularly the bus bars 421a, 421b, 421c, 421a', 421b', 421c', 422a, 422b, 422c, 422b', 422c' in this exemplary embodiment, may be assembled to the ICB frame 410 through various combinations.

As described above, the ICB assembly 401 can be prepared by combining the bus bars 421a, 421b, 421c, 421a', 421b', 421c', and the ICB assembly 402 can be prepared by combining the bus bars 422a, 422b, 422c, 422b', 422c'. Various electrical connections can be achieved by changing bus bars for the ICB frame of a given shape. Therefore, the ICB assembly of the present disclosure is for general-use, multi-purpose and multi-use.

Using the ICB assembly of the present disclosure, bus bars of various shapes can be assembled to the same ICB frame. Through this, freer electrical connection becomes possible.

The shape of the ICB assemblies 401, 402 shown in FIGS. 9-16 is only exemplary and the ICB assembly of the present disclosure may also have a different shape. This exemplary embodiment illustrates a 3P8S battery module. Because the unit cells 200 with a 3P structure are connected in parallel, the bus bars 421a, 421b, 421c, 421a', 421b', 421c', 422a, 422b, 422c, 422b', 422c' of the ICB frame 410 are for serial connection of the unit cells 200. If more parallel connection is necessary, the number of battery cells in the unit cell bank can be increased. If more serial connection is necessary, the unit cell-ICB assembly-unit cell unit can be stacked additionally. Of course, the shape of the ICB frame and the shape and location of the bus bars assembled thereto may be changed depending on the structure of serial connection in the battery module.

Figure 17:
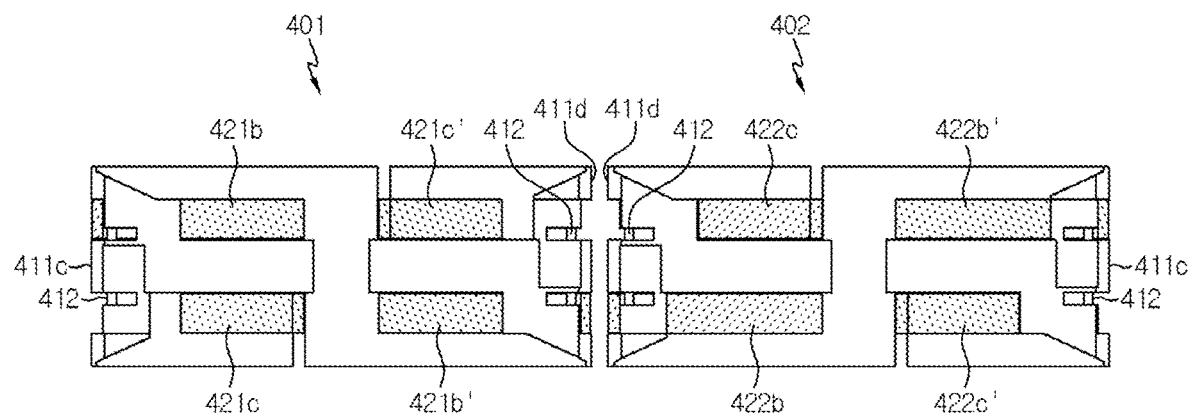
FIG. 17 illustrates connection of ICB assemblies according to an exemplary embodiment of the present disclosure.

The ICB assemblies 401, 402 may be connected side by side in the length (L) direction of the ICB frame 410. For example, as shown in FIG. 17, an ICB assembly 401 and another ICB assembly 402 may be arranged side by side and then they may be connected. The ICB frame 410 of the ICB assembly 402 may be connected to the ICB frame 410 of the ICB assembly 401 as being overturned with respect thereto. FIG. 17 shows the bottom surface of the ICB assemblies 401, 402. They are arranged such that the fourth side 411d of the ICB frame 410 of the ICB assembly 402 is beside the fourth side 411d of the ICB frame 410 of the ICB assembly 401.

Figure 18:
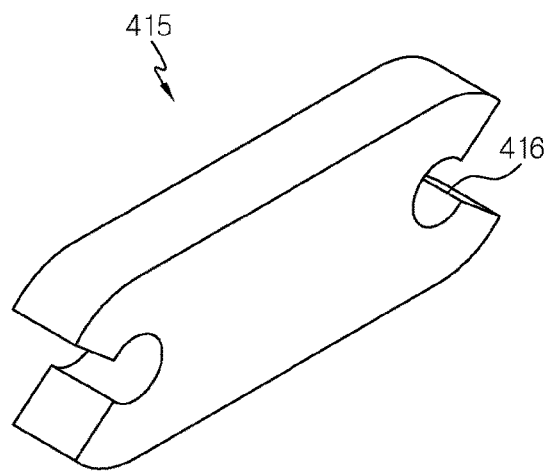
FIG. 18 is a perspective view of a joint member that can be used for connection of ICB assemblies.

At this time, a joint member 415 as shown in FIG. 18 may be used. Specifically, a hinge coupling structure may be formed such that two ICB frames 410 can be assembled by the joint member 415. For this, a rod-shaped protruding part 412 may be formed on the side surface of the ICB frame 410, and the side surfaces of two ICB frames 410 arranged along the length (L) direction may be connected by the joint member 415. In this exemplary embodiment, the joint member 415 has a shape of a round rectangle with long and short sides and has two grooves 416 at the short sides. The grooves 416 may be coupled with the protruding parts 412 formed on the third and fourth sides 411c, 411d of the ICB frame 410.

Figure 19:
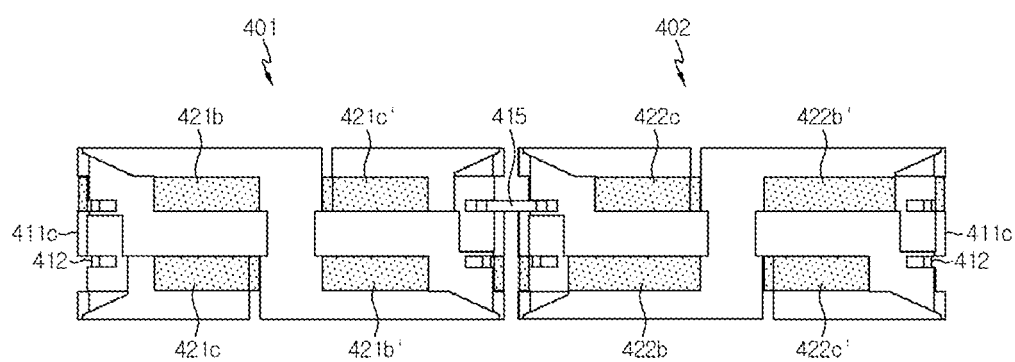
FIG. 19 shows connection of ICB assemblies using the joint member of FIG. 18.

FIG. 19 shows the side surface of the ICB frame 410 of an ICB assembly 401 connected to the side surface of the ICB frame 410 of another ICB assembly 402 in the length direction using the joint member 415.

The rod-shaped protruding parts 412 are prepared at the third and fourth sides 411c, 411d of the ICB frame 410 and the groove 416 of the joint member 415 is prepared into a C shape for coupling with the rod. Then, the open portion of the groove 416 may be coupled with the protruding part 412 of the ICB frame 410 for connection between the two ICB frames 410. And, as the protruding part 412 is rotated in the groove 416 or as the groove 416 is moved around the protruding part 412, the two ICB frames 410 may be rotated around the joint member 415.

In this exemplary embodiment, one end of the joint member 415 is coupled with one protruding part 412 of the ICB frame 410 on one side and the opposite end is coupled with another protruding part 412 of the ICB frame 410 on the other side, such that the round rectangle-shaped ICB frame 410 horizontally with the long side along the length direction and the joint member 415 itself is placed perpendicularly to the ground surface. However, the structure of the joint member 415 and the protruding part 412 may be embodied variously without being limited thereto as long as the hinge coupling structure can be embodied.

As described, the method for manufacturing a battery module according to the present disclosure includes a step of arranging the ICB frames 410 of various ICB assemblies 401, 402 in the length (L) direction of the ICB frames 410 by connecting their side surfaces with a hinge structure.

Figure 20:
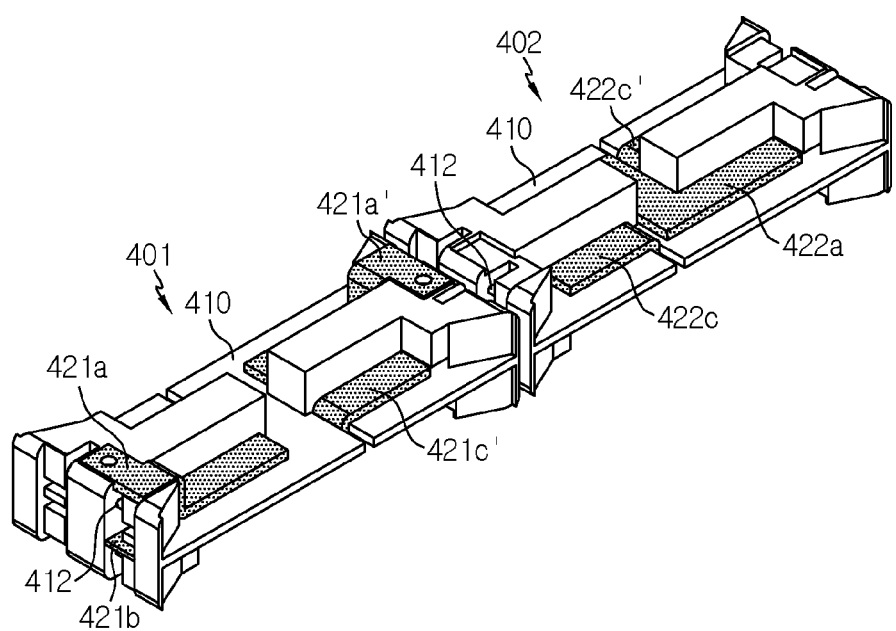
FIG. 20 shows arrangement of the two ICB assemblies of FIGS. 9-16 at the side surface.

FIG. 20 shows the two ICB frames 410 of the ICB assemblies 401, 402 connected side by side in the length (L) direction using the joint member 415 as illustrated in FIG. 18.

For the ICB frame 410 of the leftmost ICB assembly 401, the ICB frame 410 of the ICB assembly 402 adjacent thereto is converted as being overturned.

This exemplary embodiment illustrates a 3P8S battery module. Because four unit cells 200 can be connected to one ICB frame 410, two ICB frames 410 are necessary to connect a total of eight unit cells. And, the number of required ICB frames can vary depending on the number of unit cells in the battery module.

As described above, the method for manufacturing a battery module according to the present disclosure includes a step of arranging the unit cells on the top surface and the bottom surface of the ICB assembly in plane using the side-by-side coupled ICB assembly. And, it includes a step of collectively welding the arranged unit cells on the top surface and the bottom surface.

Particularly, in this exemplary embodiment, some of the unit cells 200 may be arranged first on the top surface of the ICB assemblies 401, 402 and then welding may be performed collectively on the top surface. Then, the unit cells 200 welded onto the ICB assemblies 401, 402 may be overturned such that the bottom surface of the ICB assemblies 401, 402 faces upward. Then, if the remaining unit cells 200 are arranged, it is the same as the unit cells 200 are arranged on the bottom surface of the ICB assemblies 401, 402. Then, if welding is performed collectively on the top surface, the bottom surface of the ICB assemblies 401, 402 is connected to the unit cells 200.

Figure 21:
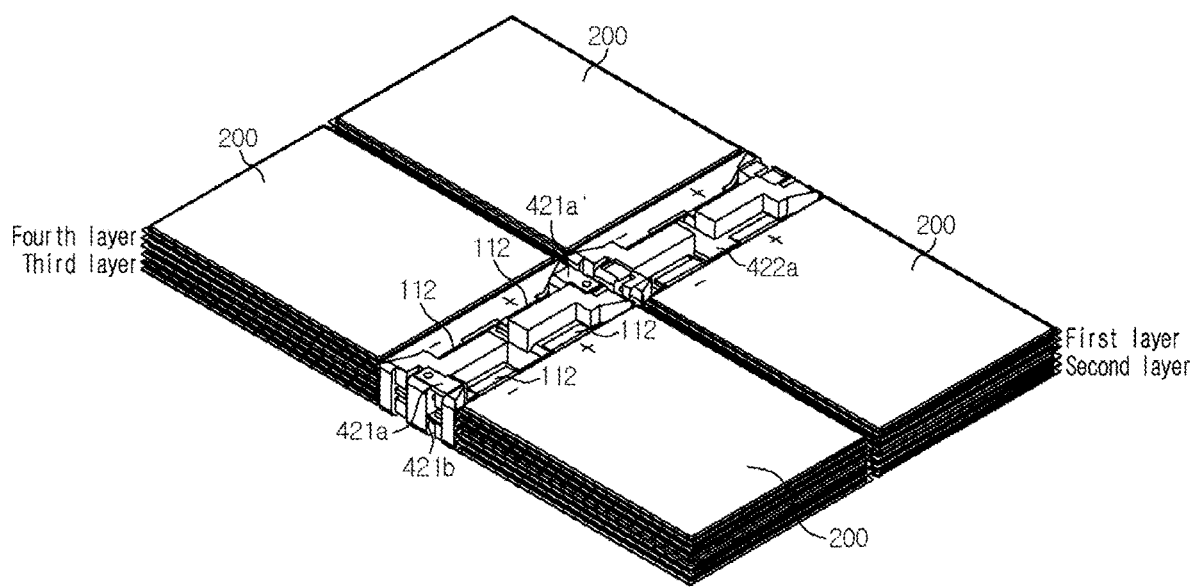
FIG. 21 illustrates a step of receiving unit cells and a step of top surface welding in a method for manufacturing a battery module according to an exemplary embodiment of the present disclosure.

FIG. 21 illustrates a step of receiving and welding unit cells in a method for manufacturing a battery module according to an exemplary embodiment of the present disclosure.

Figure 2:
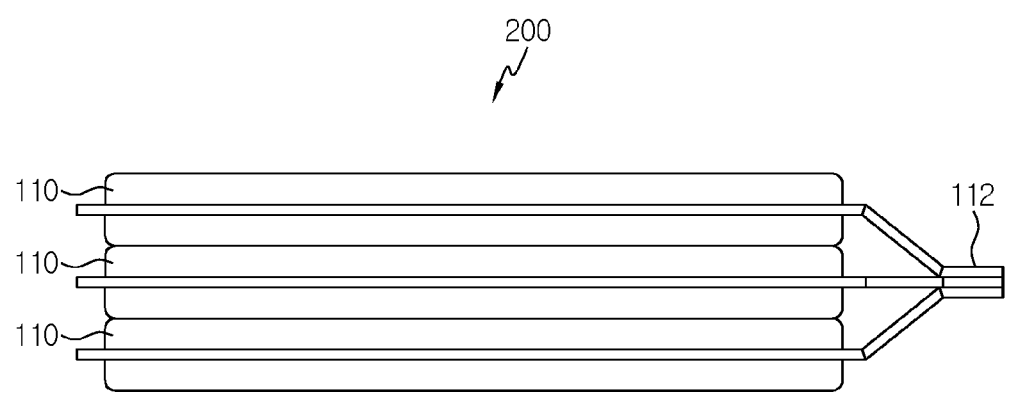
FIG. 2 is a side view of a unit cell that can be included in an existing battery module.
Figure 3:
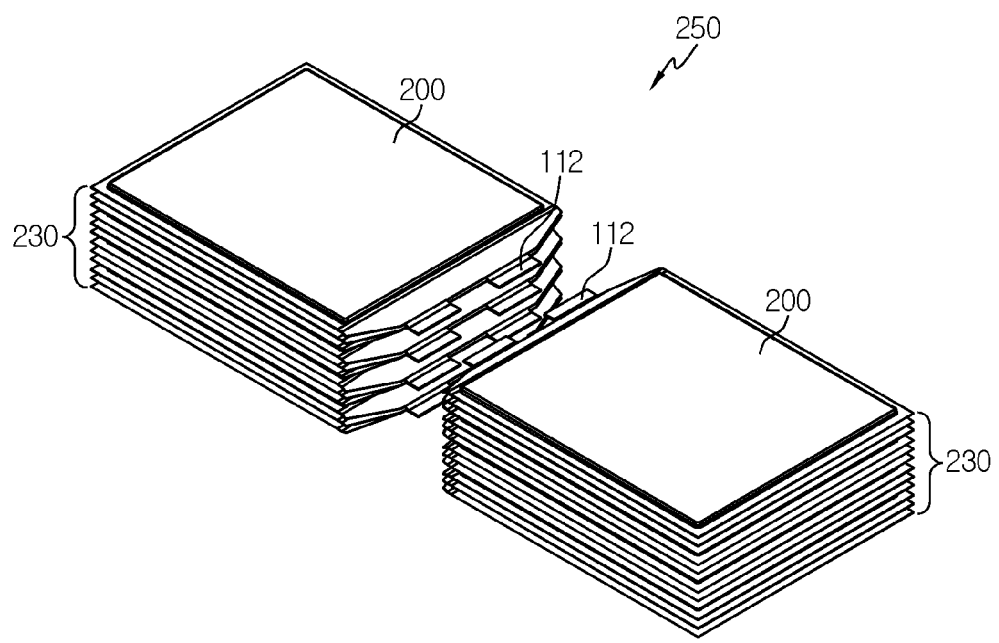
FIG. 3 shows an exemplary battery module of a horizontal stack structure including the unit cell of FIG. 2.
Figure 4:
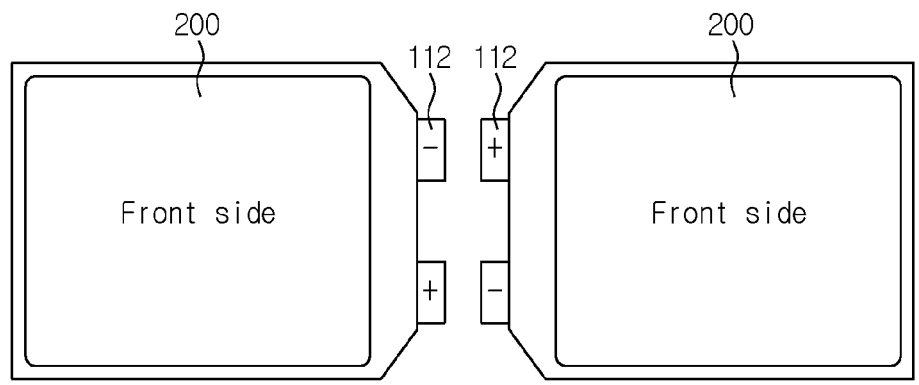
FIG. 4 and FIG. 5 show various arrangements of unit cells in a battery module of a horizontal stack structure.
Figure 4:
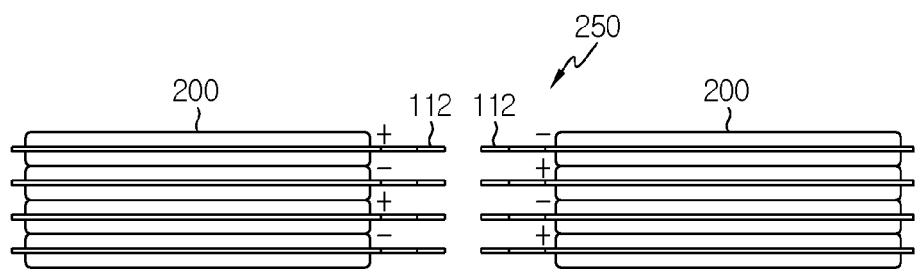
Figure 4:
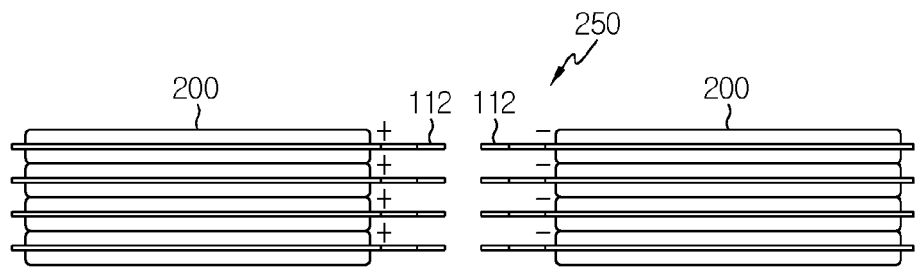

Referring to FIG. 21, after arranging a necessary number of the ICB assemblies 401, 402 and connecting them with each other using the joint member 415 as shown in FIG. 20, the unit cells 200 as illustrated in FIG. 2 are received on the ICB frame 410. For one ICB frame 410, the unit cells 200 are placed on both sides, on the top surface and the bottom surface. The bus bars 421a, 421b, 421c, 421a', 421b', 421c', 422a, 422b, 422c, 422b', 422c' are assembled onto the cell lead receiving parts A21-A24, A21'-A24' of the ICB frames 410 of the ICB assemblies 401, 402. The cell leads 112 of the unit cells 200 are placed on the bus bars 421a, 421b, 421c, 421a', 421b', 421c', 422a, 422b, 422c, 422b', 422c'.

The cell leads 112 facing each other with respect to the ICB frame 410 are of the same polarity in order to embody the electrical connection shown in FIG. 6. If the desired electrical connection is different from that shown in FIG. 6, the cell leads 112 facing each other may have opposite polarities. Then, the type and shape of the bus bars assembled to the ICB frame 410 may be changed and, accordingly, the shape of the ICB frame 410 may also be changed.

In order to help understanding, the portions corresponding to the first to fourth layers in the electrical connection shown in FIG. 6 are shown in FIG. 21, too. After all the eight unit cells 200 are received, welding is performed on the top surface and the bottom surface. The welding may be performed by laser welding or ultrasonic welding. If a wire component for voltage sensing is further included as described above, the component may also be welded at the same time.

First, the unit cells 200 of the fourth layer and the unit cells 200 of the first layer may be arranged on the top surface of the ICB assemblies 401, 402 connected by the joint member 415, as shown in FIG. 20, and then welding may be performed collectively on the top surface. Then, the unit cells 200 welded to the ICB assemblies 401, 402 are overturned such that the bottom surface of the ICB assemblies 401, 402 faces upward. If the unit cells 200 of the second layer and the unit cells 200 of the third layer are arranged in this state, the unit cells 200 are arranged on the bottom surface of the ICB assemblies 401, 402. Then, if welding is performed collectively on the top surface, the unit cells 200 are connected to the bottom surface of the ICB assemblies 401, 402.

After the welding of FIG. 21 is performed, "S22" of FIG. 6 is realized as the unit cells 200 in the fourth layer and third layer are electrically connected by the ⊏-shaped bus bars 421c, 421c' and the unit cells 200 in the second layer and the first layer are electrically connected by the ⊏-shaped bus bars 422c, 422c'. However, the unit cells 200 placed sided by side along the arranged bus bar frames 410 are not electrically connected with each other yet. That is to say, the serial connection (S23) between the unit cells 200 in the third layer and the second layer shown in FIG. 6 is not achieved yet.

Figure 22:
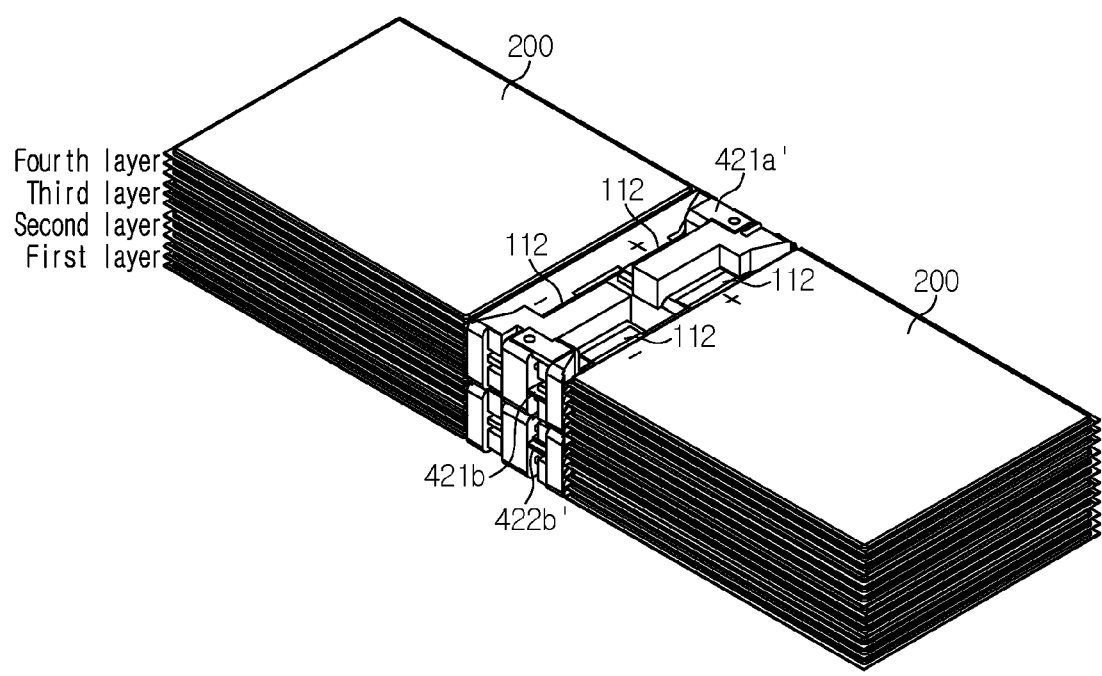
FIG. 22 is a perspective view unit cells stacked in an exemplary embodiment of the present disclosure.

Then, the unit cells 200 are stacked by folding the arranged ICB frame 410 into half with respect to the joint member 415, which is a hinge portion. For example, if the ICB frame 410 is folded into half outwardly from the central portion of FIG. 21, the unit cells 200 are stacked as it is folded into an inverted V shape with respect to the joint member 415. Finally, a total of four layers from the first to fourth layers are stacked as shown in FIG. 22. In FIG. 22, the fourth layer is placed on the top surface in the electrical connection shown in FIG. 6.

Figure 23:
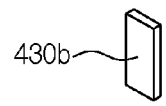
FIG. 23 illustrates coupling of additional bus bars necessary to complete the serial connection of unit cells in a method for manufacturing a battery module according to an exemplary embodiment of the present disclosure.
Figure 23:
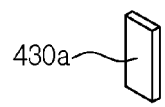
Figure 23:
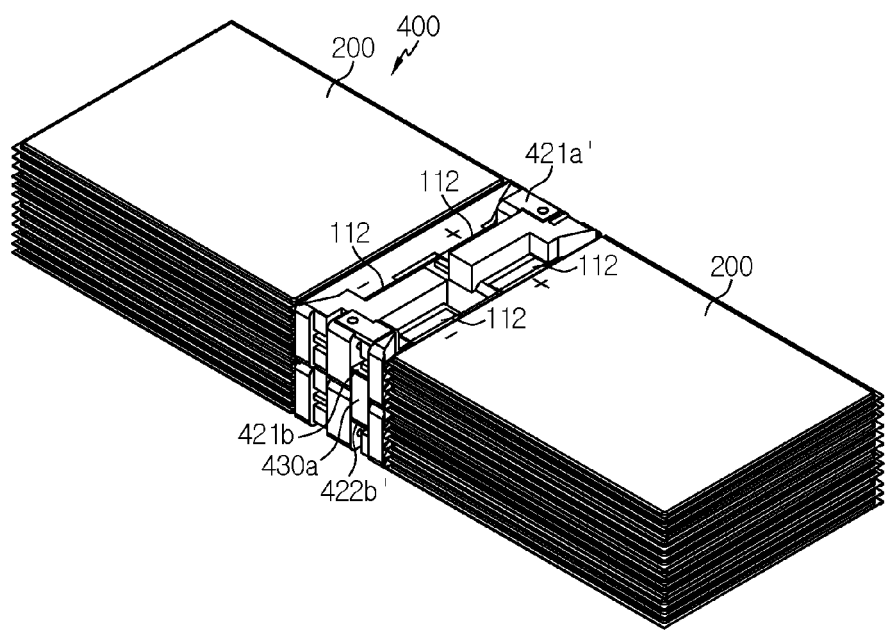

FIG. 23 illustrates coupling of additional bus bars necessary to complete the serial connection (S23) of unit cells, specifically the unit cells 200 in the third layer and the second layer, in a method for manufacturing a battery module according to an exemplary embodiment of the present disclosure. In FIG. 23, (a) shows the additional bus bars and (b) shows the state where the additional bus bars of (a) are coupled.

After the stacking as shown in FIG. 22, an additional bus bar 430a is coupled between the bus bars 421b, 422b' in the upper and lower layers exposed toward the side surface of the ICB frame 410 (the left side, or the third side 411c of the ICB frame 410). The coupling may be achieved by additional welding. As the bus bars 421b, 422b' are connected, the right unit cell 200 in the third layer and the right unit cell 200 in the second layer are connected in series (S23) up and down.

On the other side surface of the ICB frame 410 (the right side, or the fourth side 411d of the ICB frame 410), the bus bars 421b', 422b (not seen in the figure) are exposed. An additional bus bar 430b is coupled thereto. Then, as the bus bar bus bars 421b', 422b are connected, the left unit cell 200 in the third layer and the left unit cell 200 in the second layer are connected in series (S23) up and down.

If the additional bus bars 430a, 430b are coupled by additional welding, etc. on the side surface, the serial connection (S23) is realized and the other unit cells 200 placed side by side along the arranged ICB frames 410 as shown in FIG. 21 and the unit cells 200 stacked up and down as shown in FIG. 22 are connected.

The shape and number of the additional bus bars 430a, 430b will vary depending on the structure of serial/parallel connection. In this exemplary embodiment, the additional bus bars 430a, 430b of simple rectangular shape shown in FIG. 23 connect the stacked upper and lower layers. More specifically, they connect the unit cells 200 in the third layer and the second layer.

As described above, the method for manufacturing a battery module according to the present disclosure includes a step of coupling an additional bus bar at the side surface for serial connection (S23) of the unit cells stacked from the ground surface in the height direction. Thus, the battery module 400 according to an exemplary embodiment of the present disclosure shown in FIG. 23 is completed by the coupling of the additional bus bars. The battery module 400 has the electrical connection relationship shown in FIG. 6. It is prepared simply through the manufacturing method described above, by preparing the ICB assemblies 401, 402, arranging the unit cells 200 thereon, performing welding collectively and then stacking the same by folding, without having to consider the polarity of the cell leads. Therefore, according to an exemplary embodiment of the present disclosure, the battery module of a horizontal stack structure can be prepared via a very simple method as all the eight 3P bank unit cells 200 are connected in series.

The present disclosure is advantageous in that, when manufacturing the battery module wherein horizontally stacked unidirectional battery cells face each other, it is not necessary to repeat stacking and welding sequentially unlike the existing method wherein two battery cells are stacked to face each other, welding is performed between cell leads, two battery cells are stacked thereon to face each other, welding is performed between cell leads, two battery cells are stacked thereon to face each other, and then welding is performed between cell leads. The battery module may be prepared simply by a process of arranging battery cells on a plane, collectively welding the same on the top surface, stacking the same by folding the same, and coupling an additional bus bar on the side surface so that the stacked battery cells are connected up and down.

As described in detail above, the present disclosure provides an ICB assembly of a novel structure for carrying out the method for manufacturing a battery module. The ICB assembly may be embodied by coupling a various combinations of bus bars of several shapes to the ICB frame of the same shape. Because it is connected to another ICB assembly via a hinge coupling structure, the battery cells may be stacked by folding the ICB assembly with respect to the joint portion. That is to say, the ICB assembly of the present disclosure is a component which allows stacking by folding with a hinge coupling structure and coupling of various bus bars for realization of various electrical connections.

As described above, the option 4 structure according to an exemplary embodiment of the present disclosure is embodied as the battery module 400 shown in FIG. 23. After preparing two types of ICB assemblies wherein the bus bars of different shapes such as the Hv terminal bus bars, the bus bars for connection, the ⊏-shaped bus bars and the S-shaped bus bars are coupled to the type 2 ICB frame, unit cells may be stacked on the top surface and the bottom surface through collective welding and folding, and the stacked unit cells may be connected in series up and down by coupling with additional bus bars at the side surface.

Although four unit cells 200 are connected to the ICB assembly 402 in the battery module 400, there is no electrical connection in the horizontal direction and the unit cells 200 are connected in series up and down through the ICB assembly 401. The unit cells 200 in the lowermost layer are electrically connected to each other in the horizontal direction and the units cell 200 electrically connected in series are stacked in the height direction from the ground surface. And, Hv terminals [Hv positive electrode (Hv+) and Hv negative electrode (Hv−)] are formed on the top surface of the battery module 400. The ICB assemblies 401, 402 are connected by the joint member 415, and the additional bus bars 430a, 430b for serial connection of the unit cells 200 up and down are coupled on the side surface of the ICB assemblies 401, 402. The two unit cells 200 placed up and down are connected in series (S22) by the bus bars 421c, 421c', which are ⊏-shaped bus bars, assembled to the ICB assemblies 401, 402. The two unit cells 200 not connected by the bus bars 421c, 421c', which are ⊏-shaped bus bars, are connected in series (S23) up and down by the additional bus bars 430a, 430b. The unit cells 200 facing each other in the first layer are connected in series (S21) in plane by the bus bar 422a. The ICB frames 410 of the ICB assemblies 401, 402 are of the same shape and various types of ICB assemblies are embodied by changing the bus bars 421a, 421b, 421c, 421a', 421b', 421c', 422a, 422b, 422c, 422b', 422c'.

As described, a battery module may be manufactured by arranging a plurality of battery cells on a plane and stacking them by collectively welding the same using the ICB assembly of the present disclosure. In particular, the ICB assembly allows the simplest connection from numerous number of cases of electrically connecting a plurality of battery cells. According to the method for manufacturing a battery module of the present disclosure using the same, a battery module wherein horizontally stacked unidirectional battery cells face each other can be manufactured via a very simple process.

The battery module of the present disclosure, which includes the ICB assembly of the present disclosure, can be assembled very easily. In addition, the battery module can be extended as desired because the number of serially connected battery cells can be increased via simple process of further including battery cell-ICB assembly-battery cell units. That is to say, because the battery module of the present disclosure has a structure wherein the battery cell-ICB assembly-battery cell units facing each other with the ICB assembly therebetween are stacked in several layers in the height direction from the ground surface, the battery module can be extended by increasing the number of the battery cell-ICB assembly-battery cell units.

According to the present disclosure, a plurality of battery cells constituting a battery module may be connected simply from numerous number of cases of electrical connection. A hinge structure may be used as a stacking guide for stacking battery cells, and the electrical connection between ICB assemblies can be achieved by an additional bus bar on the side surface of an ICB frame. In particular, because four unit cells can be connected to one ICB assembly, a battery module can be prepared with a fewer number of components and the battery module can be prepared more quickly.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An ICB assembly comprising:
   an ICB frame configured to accommodate cell leads of unidirectional battery cells having the cell leads formed on one side of the unidirectional battery cells such that the cell leads face each other and are placed on the top surface and the bottom surface of the ICB frame; and
   a bus bar adapted to electrically connect the cell leads by being assembled to the ICB frame,
   wherein the ICB frame is a first ICB frame and coupled to a second ICB frame by a hinge structure in a length direction of the first and second ICB frames such that the first ICB frame and the second ICB frame are configured to be rotated relative to one another about the hinge structure.

2. The ICB assembly according to claim 1, wherein the ICB frame is formed to accommodate bus bars of various shapes.

3. The ICB assembly according to claim 1, wherein the ICB frame has steps and bus bar insertion holes formed such that at least one of a bus bar connected to one of the cell leads, a bus bar for connecting the cell leads facing each other, or a bus bar for connecting the cell leads placed up and down with respective to the ICB frame.

4. The ICB assembly according to claim 3, wherein the bus bar is a combination of bus bars selected from a group of bus bars having different shapes that can be assembled with the ICB frame through the steps and bus bar insertion holes considering electrical connection.

5. The ICB assembly according to claim 1, wherein the ICB frame is a plate-shaped structure having a length and a width and comprises a cell lead receiving part capable of receiving the cell leads of the battery cells such that the battery cells face each other with respect to a center line in a length direction on both sides, an Hv terminal receiving part and bus bar insertion holes.

6. The ICB assembly according to claim 5, wherein the bus bar is detachably assembled to the cell lead receiving part.

7. The ICB assembly according to claim 5, wherein
   the cell lead receiving part is formed along first and second sides in the length direction of the ICB frame and comprises a first cell lead receiving part and a third cell lead receiving part along the first side and a second cell lead receiving part facing the first cell lead receiving part and a fourth cell lead receiving part facing the third cell lead receiving part along the second side, and
   the Hv terminal receiving part is formed on third and fourth sides in a width direction, perpendicular to the first and second sides, and comprises a first Hv terminal receiving part in the third side and a second Hv terminal receiving part on the fourth side.

8. The ICB assembly according to claim 7, wherein
   the first to fourth cell lead receiving parts and the first and second Hv terminal receiving parts are formed on the top surface of the ICB frame,
   first to fourth opposite cell lead receiving parts formed mirror-symmetrically to the first to fourth cell lead receiving parts are formed on opposite sides of the first to fourth cell lead receiving parts on the bottom surface of the ICB frame, and
   first and second opposite Hv terminal receiving parts formed mirror-symmetrically to the first and second Hv terminal receiving parts are formed on opposite sides of the first and second Hv terminal receiving parts.

9. The ICB assembly according to claim 8, wherein the bus bar insertion holes comprise
   a first bus bar insertion hole allowing insertion of a first bus bar from the third side toward the first cell lead receiving part, a second bus bar insertion hole allowing insertion of a second bus bar from the third side toward the second cell lead receiving part, a third bus bar insertion hole allowing insertion of a third bus bar from the fourth side toward the third cell lead receiving part, and a fourth bus bar insertion hole allowing insertion of a fourth bus bar from the fourth side toward the fourth cell lead receiving part,
   an additional first bus bar insertion hole allowing insertion of another first bus bar from the third side toward the first opposite cell lead receiving part, an additional second bus bar insertion hole allowing insertion of another second bus bar from the third side toward the second opposite cell lead receiving part, an additional third bus bar insertion hole allowing insertion of another third bus bar from the fourth side toward the third opposite cell lead receiving part, and an additional fourth bus bar insertion hole allowing insertion of another fourth bus bar from the fourth side toward the fourth opposite cell lead receiving part, and
   a first side bus bar insertion hole formed between the second cell lead receiving part and the fourth cell lead receiving part inwardly from the second side, and a second side bus bar insertion hole formed between the first cell lead receiving part and the third cell lead receiving part inwardly from the first side.

10. The ICB assembly according to claim 9, wherein the bus bar comprises:
    a first Hv terminal bus bar comprising a first portion placed on the first Hv terminal receiving part and a second portion placed on the second cell lead receiving part, a second Hv terminal bus bar comprising a first portion placed on the second Hv terminal receiving part and a second portion placed on the third cell lead receiving part,
a first bus bar for connection placed on the second opposite cell lead receiving part,
a second bus bar for connection placed on the third opposite cell lead receiving part,
a first ⊏-shaped bus bar placed on the first and first opposite cell lead receiving parts at the same time, and
a second ⊏-shaped bus bar placed on the fourth and fourth opposite cell lead receiving parts at the same time.

11. The ICB assembly according to claim 10, wherein
the first Hv terminal bus bar is assembled by being placed on the first Hv terminal receiving part and the second cell lead receiving part,
the second Hv terminal bus bar is assembled by being placed on the second Hv terminal receiving part and the third cell lead receiving part,
the first bus bar for connection is assembled by being inserted into the additional second bus bar insertion hole, and the second bus bar for connection is assembled by being inserted into the additional third bus bar insertion hole, and
the first ⊏-shaped bus bar is assembled by being inserted into the second side bus bar insertion hole, and the second ⊏-shaped bus bar is assembled by being inserted into the first side bus bar insertion hole.

12. The ICB assembly according to claim 9, wherein the bus bar comprises:
an S-shaped bus bar placed on the second opposite and third opposite cell lead receiving parts,
a first bus bar for connection placed on the second cell lead receiving part,
a second bus bar for connection placed on the third cell lead receiving part,
a first ⊏-shaped bus bar placed on the first and first opposite cell lead receiving parts at the same time, and
a second ⊏-shaped bus bar placed on the fourth and fourth opposite cell lead receiving parts at the same time.

13. The ICB assembly according to claim 12, wherein
the S-shaped bus bar is assembled by being placed on the second opposite and third opposite cell lead receiving parts,
the first bus bar for connection is assembled by being inserted into the third bus bar insertion hole, and the second bus bar for connection is assembled by being inserted into the fourth bus bar insertion hole, and
the first ⊏-shaped bus bar is assembled by being inserted into the second side bus bar insertion hole, and the second ⊏-shaped bus bar is assembled by being inserted into the first side bus bar insertion hole.

14. The ICB assembly according to claim 1, wherein each of the first and second ICB frames has a rod-shaped protruding part formed on a side surface thereof such that the first and second ICB frames are configured to be arranged along a length direction and coupled by a joint member equipped with a groove which is coupled to the protruding part between the side surfaces of the first and second ICB frames.

15. The ICB assembly according to claim 1, wherein the bus bar is assembled to the top surface and the bottom surface of the ICB frame.

16. A method for manufacturing a battery module comprising:

(a) a step of preparing an ICB assembly comprising an ICB frame configured to accommodate cell leads of unidirectional battery cells having the cell leads formed on one side thereof such that the cell leads face each other; and a bus bar adapted to electrically connect the cell leads by being assembled to the ICB frame, wherein the ICB frame is configured to accommodate bus bars of different shapes;
(b) a step of arranging the ICB assembly in a length direction of the ICB frame by coupling the ICB frame of the ICB assembly with a second ICB frame of a second ICB assembly via a hinge structure in a side-by-side relationship such that the first ICB frame and the second ICB frame are configured to be rotated relative to one another about the hinge structure;
(c) a step of arranging the battery cells to face each other on a plane by receiving the battery cells on a top surface and a bottom surface of the ICB frame on the left and right sides of the length direction of the side-by-side coupled ICB frame, wherein the battery cells are arranged on a plane by receiving the cell leads on the bus bar and the ICB assembly and the battery cells are connected by collectively welding the bus bar and the cell leads to the arranged battery cells on the top surface and the bottom surface;
(d) a step of stacking the battery cells by folding the arranged ICB frame at the hinge portion; and
(e) a step of assembling an additional bus bar between the bus bar exposed at a side surface of the ICB frame.

17. The method for manufacturing a battery module according to claim 16, wherein, in the step (c),
after said arranging the battery cells to face each other on a plane by receiving the battery cells on the top surface of the ICB frame on the left and right sides of the length direction of the side-by-side coupled ICB frame, wherein the battery cells are arranged on a plane by receiving the cell leads on the bus bar and the ICB assembly and the battery cells are connected by collectively welding the bus bar and the cell leads to the arranged battery cells on the top surface,
the ICB assembly and the battery cells connected are overturned such that the bottom surface of the ICB frame faces upward, and
the remaining battery cells are arranged on the bottom surface of the ICB frame and the bus bar and the cell leads are welded collectively.

18. A battery module comprising:
battery cells, an ICB assemblies, and battery cell units, wherein unidirectional battery cells having cell leads formed on one side are placed and connected to face each other with one of the ICB assemblies therebetween, the battery cells, the ICB assemblies and the battery cell units being stacked from the ground surface in a height direction, wherein
each ICB assembly comprises an ICB frame accommodating the cell leads; and
a bus bar electrically connected to the cell leads by being assembled to the ICB frame, wherein the stacked ICB assemblies are connected by a joint member including a hinge portion such that the ICB assemblies are configured to be rotatable relative to one another about the joint member, and an additional bus bar for serial connection of the battery cells up and down is coupled to a side surface of the stacked ICB assembly,
four battery cells are connected to one ICB assembly as the battery cells are connected to a top surface and a bottom surface of the ICB assembly, and two battery cells placed up and down are connected in series by the bus bar assembled to the ICB frame, and the ICB frame of each ICB assembly has the same shape and various ICB assemblies are prepared by changing the bus bars.

19. The battery module according to claim 18, wherein the battery cells are bank unit cells stacked in parallel such that the cell leads of the same polarity are contacted with each other.

* * * * *